United States Patent
Skuratovich et al.

(10) Patent No.: US 10,362,069 B2
(45) Date of Patent: Jul. 23, 2019

(54) PROTOCOL FALLBACK

(71) Applicant: Microsoft Technology Licensing, LLC, Redmond, WA (US)

(72) Inventors: Uladzimir A. Skuratovich, Redmond, WA (US); Namendra Kumar, Redmond, WA (US); Andrey Belenko, Redmond, WA (US); Timothy Mark Moore, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 14/958,865

(22) Filed: Dec. 3, 2015

(65) Prior Publication Data
US 2017/0163693 A1 Jun. 8, 2017

(51) Int. Cl.
*G06F 15/16* (2006.01)
*H04L 29/06* (2006.01)
(Continued)

(52) U.S. Cl.
CPC .......... *H04L 65/1069* (2013.01); *H04L 65/40* (2013.01); *H04L 67/02* (2013.01);
(Continued)

(58) Field of Classification Search
CPC .................................................. H04L 65/1069
(Continued)

(56) References Cited

U.S. PATENT DOCUMENTS 6,253,326 B1 6/2001 Lincke et al.
6,816,912 B1 11/2004 Borella et al.
(Continued)

FOREIGN PATENT DOCUMENTS

| DE | 102010013374 | 10/2011 |
|----|--------------|---------|
| EP | 1251670 | 10/2002 |
| EP | 1378064 | 5/2012 |

OTHER PUBLICATIONS

"International Search Report and Written Opinion", Application No. PCT/US2016/062636, dated Feb. 9, 2017, 14 pages.
(Continued)

*Primary Examiner* — Frantz B Jean
(74) *Attorney, Agent, or Firm* — Schwegman Lundberg & Woessner, P.A.

(57) ABSTRACT

A session is established between an initiating device and a remote device. A session request is transmitted from the initiating device to the remote device according to a preferred networking protocol. If no provisional response to the request is received at the initiating device within an initial duration, the initiating device transmits another session request to the other device according to a non-preferred protocol. If a provisional response to the request is received within the initial duration, the initiating device continues to monitor the elapsed time for an so extended duration. If no final response to the request is received within the extended duration, the initiating device transmits another session request to the other device according to a non-preferred protocol. If a final response is received within the extended duration, a session between the initiating device and the other device is established according to the preferred networking protocol.

20 Claims, 13 Drawing Sheets

(51) Int. Cl.
*H04L 29/08* (2006.01)
*H04L 29/14* (2006.01)

(52) U.S. Cl.
CPC ............ *H04L 69/04* (2013.01); *H04L 69/161*
(2013.01); *H04L 69/165* (2013.01); *H04L*
*69/28* (2013.01); *H04L 69/40* (2013.01)

(58) Field of Classification Search
USPC .................................................. 709/227, 228
See application file for complete search history.

(56) References Cited

U.S. PATENT DOCUMENTS

| | | | |
|---|---|---|---|
| 7,230,945 | B2 | 6/2007 | Yeom |
| 7,369,537 | B1 | 5/2008 | Kichhoff et al. |
| 7,529,200 | B2 | 5/2009 | Schmidt et al. |
| 7,853,962 | B1 | 12/2010 | Romano et al. |
| 7,971,240 | B2 | 6/2011 | Guo et al. |
| 8,355,399 | B1 | 1/2013 | Wilson et al. |
| 8,452,896 | B2 | 5/2013 | Meskauskas |
| 8,584,218 | B2 | 11/2013 | Peterson et al. |
| 2003/0007483 | A1 | 1/2003 | Um |
| 2003/0217288 | A1 | 11/2003 | Guo et al. |
| 2004/0093515 | A1 | 5/2004 | Reeves |
| 2006/0133614 | A1 | 6/2006 | Zhang et al. |
| 2007/0110046 | A1 | 5/2007 | Farrell et al. |
| 2008/0120315 | A1 | 5/2008 | Ionescu et al. |
| 2009/0024763 | A1 | 1/2009 | Stepin et al. |
| 2009/0290711 | A1 | 11/2009 | Bloom et al. |
| 2010/0241754 | A1* | 9/2010 | Niiya ................... H04L 65/105 709/228 |
| 2011/0044321 | A1 | 2/2011 | Rosenberg et al. |
| 2012/0005352 | A1* | 1/2012 | Nitta ................... H04L 65/1069 709/227 |
| 2012/0321087 | A1 | 12/2012 | Fleischman et al. |
| 2013/0019025 | A1 | 1/2013 | Chaturvedi et al. |
| 2013/0170471 | A1 | 7/2013 | Nix |
| 2013/0229279 | A1 | 9/2013 | Sewall et al. |
| 2014/0108668 | A1 | 4/2014 | Zhang et al. |
| 2014/0351447 | A1* | 11/2014 | Annamalaisami ........................... H04L 65/1069 709/227 |
| 2015/0016446 | A1 | 1/2015 | Scott |
| 2017/0163607 | A1 | 6/2017 | Skuratovich et al. |
| 2017/0163694 | A1 | 6/2017 | Skuratovich et al. |

OTHER PUBLICATIONS

"International Search Report and Written Opinion", Application No. PCT/US2016/062640, dated Mar. 2, 2017, 11 pages.
"International Search Report and Written Opinion", Application No. PCT/US2016/062639, dated May 12, 2017, 23 pages.
Willis,"An Extension to the Session Initiation protocol to Assure Congestion Safety", Retrieved at: https://tools.ietf.org/html/draft-willis-sip-congestsafe-00, Jun. 20, 2002, 11 pages.
"Secure Key", Available at: https://devcenter.heroku.com/articles/securekey, Sep. 30, 2015, 3 pages.
Brauer,"How to Rotate Access Keys for IAM Users", Available at: https://blogs.aws.amazon.com/security/post/Tx15CIT22V4J8RP/How-to-rotate-access-keys-for-IAM-users, Oct. 2, 2013, 4 pages.
Cidon,"Hybrid TCP-UDP Transport forWeb Traffic", In Proceedings of IEEE International Performance, Computing and Communications Conference, Feb. 10, 1999, 20 pages.
Corella,"It Is Time to Redesign Transport Layer Security", In White Paper of Pomcor, Feb. 6, 2015, 22 pages.
Eyers,"Predicting Internet Telephony Call Setup Delay", In Proceeding of 1st IP-Telephony Workshop, Apr. 12, 2000, 11 pages.
Malliah,"Call Setup Delay Analysis of H.323 and SIP", In Master's Thesis in Computer Network Engineering of Halmstad University, Mar. 2011, 74 pages.
Melnyk,"On Signaling Efficiency for Call Setup in all-IP Wireless Networks", In Proceedings of IEEE International Conference on Communications, vol. 5, Jun. 11, 2006, pp. 1939-1945.
Salowey,"AES Galois Counter Mode (GCM) Cipher Suites for TLS", Available at: https://tools.ietf.org/pdf/rfc5288.pdf, Aug. 2008, 8 pages.
Shen,"The Impact of TLS on SIP Server Performance: Measurement and Modelling", In Journal of IEEE/ACM Transactions on Networking, vol. 20, Issue 4, Aug. 2012, 14 pages.
Stark,"The Case for Prefetching and Prevalidating TLS Server Certificates", In Proceedings of 19th Annual Network & Distributed System Security Conference, Feb. 5, 2012, 12 pages.
Swett,"QUIC—Next Generation Multiplexed Transport over UDP", Available at: https://www.nanog.org/sites/default/files/meetings/NANOG64/1051/20150603_Rogan_Quic_Next_Generation_v1.pdf—Retrieved on: Nov. 23, 2015, 30 pages.
Thomson,"Offline Server Configuration for Zero Round Trip Transport Layer Security", Available at: https://tools.ietf.org/pdf/draft-thomson-tls-offline-config-00.pdf, Oct. 19, 2015, 7 pages.
"Non Final Office Action Issued in U.S. Appl. No. 14/958,871", dated Dec. 1, 2017, 11 Pages.
"International Preliminary Report on Patentability Issued in PCT Application No. PCT/US2016/062640", dated Feb. 8, 2018, 8 Pages.
"Second Written Opinion Issued in PCT Application No. PCT/US2016/062640", dated Nov. 15, 2017, 7 Pages.
"QUIC Discovery", [online]. [retrieved on Jul. 6, 2018]. Retrieved from the Internet: <URL: https://docs.google.com/document/d/1i4M7DbrWGgXafHxwl8SwlusY2ELUe8WX258xt2LFxPM/edit#heading=h.dk2fhev07ryt>2, (Oct. 28, 2014), 1 Page.
Roskind, James, "QUIC Multiplexed Stream Transport Over UDP", [online]. [retrieved on Jul. 28, 2018]. Retrieved from the Internet: <URL: https://docs.google.com/document/d/1RNHkx_VvKWyWg6Lr8SZ-saqsQx7rFV-ev2jRFUoVD34/edit>, (2013), 51 Pages.
"QUIC, a multiplexed stream transport over UDP—The Chromium Projects", [online]. Retrieved from the Internet: <URL: https://www.chromium.org/quic>, 2019, 2 Pages.
"[QUIC] graceful fallback to tcp", e-mail thread, May 18, 2016, 1 pg. E.
Gratzer, F., et al., "QUIC—Quick UDP Internet Connections", Network Architectures and Services, Se[tember, 2016, 39-46.
Iyengar, J., et al., QUIC: A UDP-Based Secure and Reliable Transport for HTTP/2 draft-tsvwg-tsvwg-quic-protocol-00, Network Working Group, Jun. 17, 2015, 30 Pages.
Langley, A., et al., "The QUIC Transport Protocol: Design and Internet-Scale Deployment", SIGCOMM '17, Aug. 21-25, 2017, Los Angeles, CA, USA, 2017, 183-196.
Willis, N., "Connecting on the QUIC", (c) 2013, Eklektix Inc., 13 Pages.

* cited by examiner

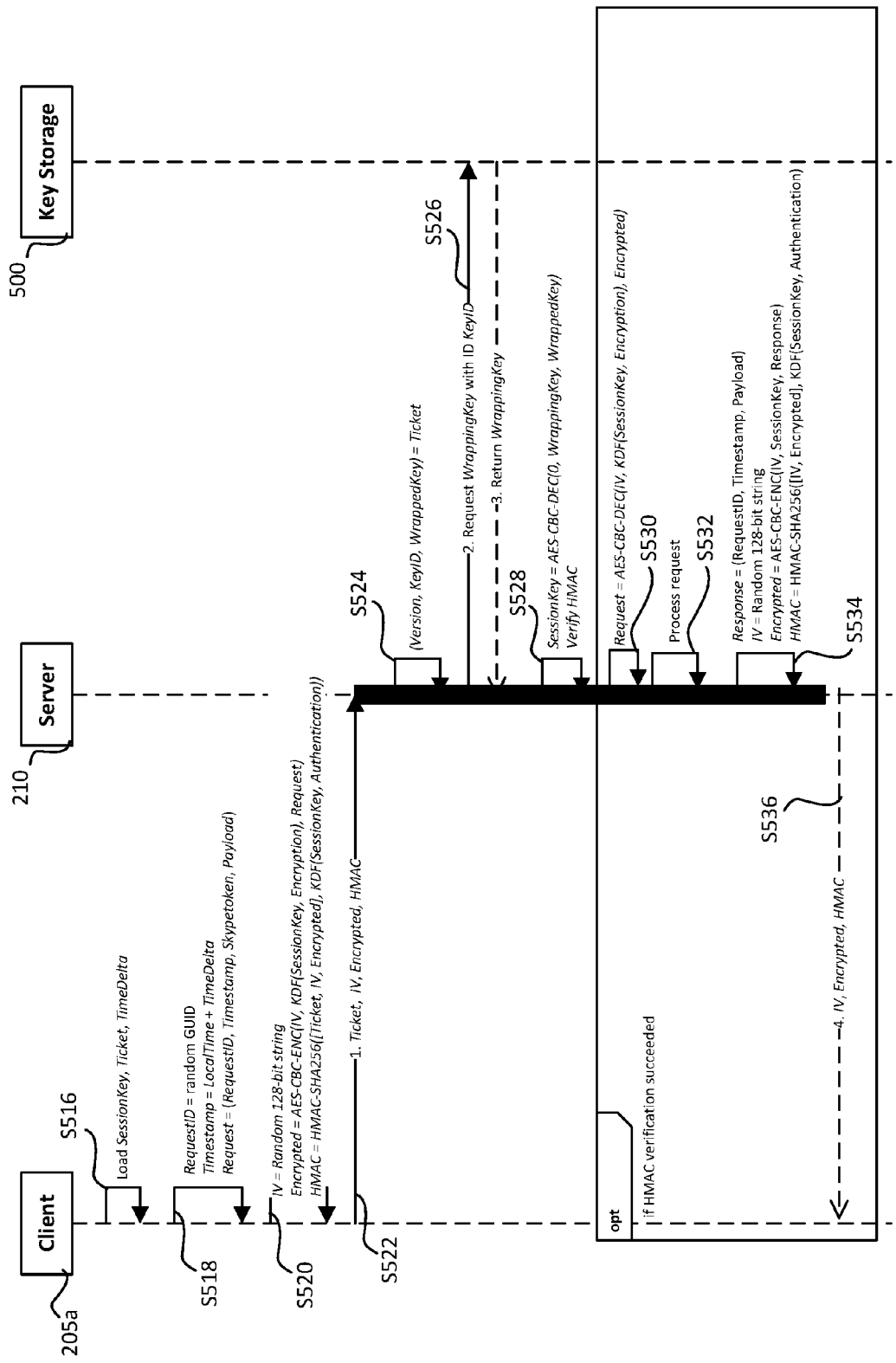

PROTOCOL FALLBACK

BACKGROUND

A communication event may be established between an initiating device (that is, a calling device) and at least one responding device (that is a callee device). The communication event may for example be a call (audio or video call), a screen or whiteboard sharing session, other real-time communication event etc. The communication event may be between the initiating device and multiple responding devices, for example it may be a group call.

The communication event may be established by performing an initial signalling process, in which messages are exchanged via a network, so as to provide a means by which media data (audio and/or video data) can be exchanged between the devices in the established communication event. The signalling phase may be performed according to various protocols, such as SIP (Session Initiating Protocol) or bespoke signalling protocols. The media data exchange rendered possible by the signalling phase can be implemented using any suitable technology, for example using Voice or Video over IP (VoIP), and may or may not be via the same network as the signalling.

The communication event may be established under the control of a communications controller, such as a call controller. That is, the communications controller may control at least the signalling process. For example, all messages of the signalling process sent to the caller and callee devices may be sent from the communication controller, and between the devices themselves. For example, the calling device may initiate the signalling process by sending an initial request to the communications controller, but the communications controller may have the freedom to accept or reject the initial request. If the initial request is accepted, the communications controller itself may send out call invite(s) to the call device(s), and the responding device(s) in turn may respond to the communications controller (not the initiating device directly).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to some aspects of the present subject matter, a session is established between an initiating device and a remote device. A session request is transmitted from the initiating device to the remote device according to a preferred networking protocol. An elapsed time is monitored by the initiating device for an initial duration from a timing of the transmission. If no provisional response to the request is received at the initiating device within the initial duration, the initiating device transmits another session request to the other device according to a non-preferred protocol. If a provisional response to the request is received within the initial duration, the initiating device continues to monitor the elapsed time for an extended duration. If no final response to the request is received within the extended duration, the initiating device transmits another session request to the other device according to a non-preferred protocol. If a final response is received within the extended duration, a session between the initiating device and the other device is established according to the preferred networking protocol.

Another aspect is directed to a method of compressing messages for transmission from a network device to another device, performed by the network device. An uncompressed message for transmission to the other device via a network is generated. A compressed vision of the message, having a reduced message size, is generated by applying a compression function to the uncompressed message. The reduced message size of the compressed version is determined. The reduced message size is compared to a maximum transport packet size of a preferred one of a plurality of transport protocols. If the reduced message size exceeds the maximum transport packet size of the preferred transport protocol, the uncompressed or the compressed version of the message is encapsulated into one or more transport packets according to a non-preferred one of the transport protocols, and the one or more transport packets are transmitted to the other device according to the non-preferred transport protocol via the network. If the size of the compressed message does not exceed the maximum transport packet size of the preferred transport protocol, the compressed version of the message is encapsulated into a single transport packet according to the preferred transport protocol, and the transport packet is transmitted to the other device according to the preferred transport protocol via the network.

BRIEF DESCRIPTION OF FIGURES

For a better understanding of the present subject matter, and to show how the same may be carried into effect, reference is made by way of example only to the following figures, in which:

FIG. 5B shows a signalling diagram for a subsequent call establishment phase.

DETAILED DESCRIPTION OF EMBODIMENTS

Figure 1:
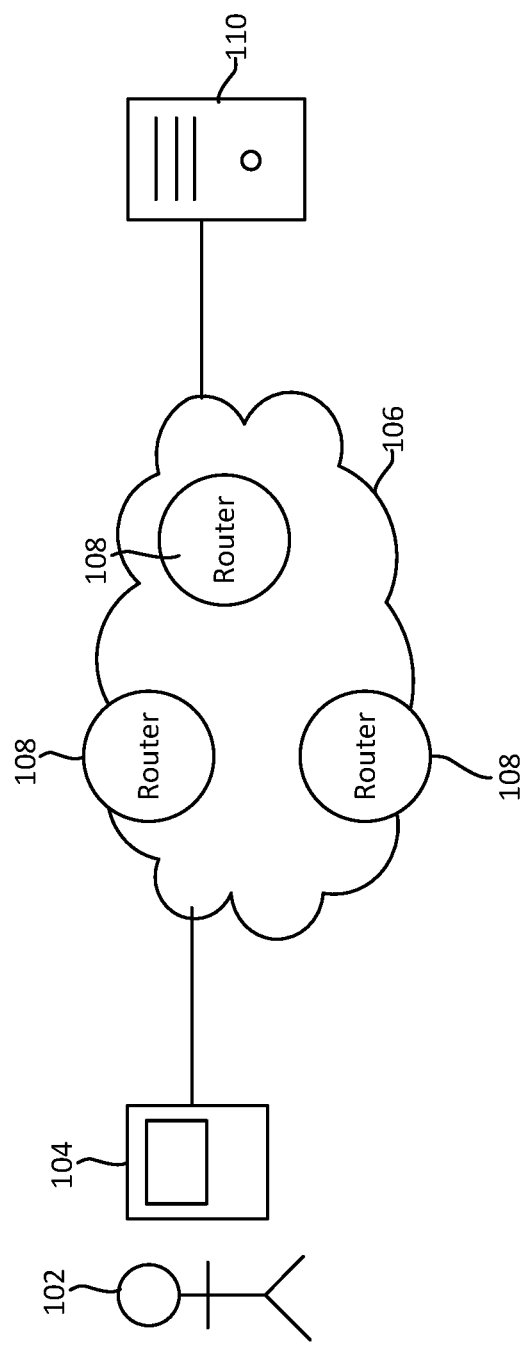
FIG. 1 shows a known type of communication system.

Among other things, different aspects of the present disclosure are respectively directed to:
1) a novel encryption method for use in providing secure communications signalling (e.g. call signalling)—section 1, below;
2a) a novel protocol fallback method, for use in communications signalling—section 2a, below; and 2b) a novel data compression method, for use in communications-signalling—section 2b, below.

As explained below, any of the above method can be combined with one or both of the other methods. In the describe embodiments techniques all three are combined to provide secure communications signalling over UDP—leading to reduced call setup times in most cases without comprising security. Thorough 1) and 2a), it becomes possible, among other things, to encapsulate an encrypted, compressed message in a single transport layer packet, an in particular a datagram of an unreliable transport layer protocol such as UDP—which obviates the need for any application layer reassembly mechanism and makes UDP viable in most cases for call signalling—whilst 2b) ensures that call signalling can fall back to TCP should UDP be unavailable in a particular circumstance. This combination provides call signalling that is fast, secure and reliable notwithstanding the preferred use of the unreliable transport protocol, e.g. UDP.

1) Secure Call Signalling

A communication event is established between an initiating device and a responding device under the control of a remote communications controller. The communication event establishment procedure is secured using pre-exchanges session key data.

In a pre-communication event establishment phase:
- a secure connection is established between the initiating device and the communications controller,
- session key negotiation messages are exchanged between the initiating device and the communications controller via the secure connection to obtain session key data in an electronic storage location accessible to the initiating device, and
- the secure connection terminates once the session key data has been obtained.

The session key data is for use by the initiating device in generating encrypted message payloads that are decryptable by the communications controller.

In a subsequent communication event establishment phase, a communication event request payload, for transmission to the communications controller, is generated and encrypted by the initiating device using the session key data stored in the accessible memory location. In response to a communication event establishment instruction received at the initiating device after the session key data has been obtained and the secure connection has terminated in the pre-establishment phase, a communication event request is transmitted from the initiating device to the communications controller. The communication event request comprises the encrypted request payload. The communications controller is able to decrypt the encrypted request payload, allowing the communication event between the devices to be established under the control of the communications controller based on the decrypted payload.

Among other things, the present subject matter provides:
(i) secure signalling between the initiating device and the responding device during the initial establishment of the communication event;
(ii) without increasing the call setup time; and
(iii) using minimal processing resources and network bandwidth.

In accordance with the present subject matter, the signalling itself is not conducted via the secure connection, i.e. the communication event request is not transmitted via the secure connection. The secure connection is terminated before the communication event instruction is received, and the security of the signalling, i.e. (i), is provided, in the communication event establishment phase, by the payload encryption based on the obtained session key data. The session key data is obtained securely as the secure connection is used for its negotiation. This does not increase the call setup time, i.e. (ii), because the session key data is pre-negotiated before the communication event is instructed, e.g. by a user of the initiating device; nor does it require excessive processing resources or bandwidth, i.e. (iii), as the secure connection is terminated once the session key data has been obtained, meaning that processing and bandwidth are not required to keep the secure alive after the session key data has been obtained.

The term "call set up time" refers to a time interval from a time the communication event establishment instruction being received (which may for example be instigated manually by a user of the initiating device, for example by the user selecting an option to call the responding device or a user thereof at the initiating device) to a time the communication event establishment request is transmitted. Note that the term "call set up time" is used, for conciseness, in relation to both calls and other types of communication event, such as screen sharing sessions, shared whiteboard sessions, other real-time media communication events etc.

In the context of a connection between an initiating device and a communications controller, the term "connection" means a logical connection between the initiating device and the communications controller that is:
- established by performing at least one channel establishment handshake procedure, in which at least one handshake message is exchanged between the initiating device and the communications controller; and/or
- which is maintained by implementing a state machine for the connection in memory of the initiating device and/or the communications controller.

The connection is terminated when the state machine transitions to a disconnected state, for example when the connection
- is torn down: i.e. by performing at least at least one termination procure, in which at least one termination message is exchanged between the initiating device and the communications controller; and/or
- expires i.e. upon expiry of an inactivity timer at the initiating device and/or the communications controller (in which case the connection may terminate without any termination handshake procedure).

For example, the connection may be a TLS (Transmission Layer Security) or SSL (Secure Sockets Layer) connection established via a network having a plurality of network layers, including an application layer and a transport layer above the transport layer. As is known, SSL and TLS refer to earlier versions of the same protocol—"TLS" is used throughout this disclosure as shorthand for either TLS or SSL, and any disclosure pertaining to TLS herein applies equally to SSL.

A TLS connection is a TCP (Transmission Control Protocol) connection at the transport layer that is secured using TLS. In this case, the state machine may track both TCP and TLS state changes, in accordance with the TCP and TLS protocols respectively. For example, separate TCP and TLS handshake procedures are performed in this case, causing transitions of the TCP and TLS state machines respectively.

As another example, the connection may be a DTLS (Datagram TLS) connection established via the network. DTLS operates over UDP. Although UDP is a connectionless transport protocol (i.e. transport layer protocol), which has no state or handshake messages, the DTLS protocol itself defines both a handshake procedure and a state machine. In this case, the state machine at the initiating device and/or the communications controller tracks DTLS transitions, e.g. as the DTLS handshake procedure progresses, even though it does not track UDP directly.

As another example, the connection may be a higher level connection such as an HTTPS (i.e. secure HTTP) connection. Note herein HTTP/TCP means HTTP over TCP; HTTPS means HTTP over a TLS connection, that is HTTPS=HTTP/TLS.

No existing call set up procedure provides all three of the above mentioned effects i.e. all three of (i), (ii) and (iii).

The electronic storage location in which the session key data is stored can be a location in any suitable type of electronic storage, for example volatile and/or in-memory storage, long term storage (e.g. hard disk) available to the initiating device. Long term storage may be used to make sure that the negotiated key survives reboots. For example, mobile phones may lose their power and then upon charge may be restarted, and because the communication client is not activated upon phone start up, there would be no chance to re-negotiate a new security token. As such, it may be desirable to implementations may wish to keep previously-session key data safe to enable users to initiate a communication event very fast, even in the event of a re-boot.

Note that references to "memory" hereinbelow can refer to any such electronic storage, including volatile memory (including processor memory) and non-volatile memory (such as flash or magnetic memory, including hard disks).

FIG. 1 shows an example of an existing type of communication system, which comprises a network 106 and connected to the network 106: a client device 104, operated by a user 102, and a server 110, such as an SIP server, 110. The network 102 is an internetwork (internet); that is, a plurality of interconnected, individual networks. The internet 102 has a plurality of network layers: a link layer 112, a network layer 114 above the link layer 112, a transport layer 116 above the network layer 114 and an application layer 118 above the transport layer 116. The internet 102 includes a plurality of routers 108, which route data at the network layer 114 between individual networks of the internet 102. The network layers 112-118 are not shown explicitly in FIG. 1, though they are shown in later figures. The internet 102 may for example the Internet (capital I) or another internet operating in accordance with the TCP/IP Protocol Suite, or more generally any network having a layered architecture, e.g. in accordance with the OSI model. Note that in the context of the OSI model, references to "the application layer" herein denote all of OSI L5 though L7, references to "the transport layer" denote OSI L4, references to "the network layer" OSI L3, and "the link layer" OSI L2-L1.

Figure 1A:
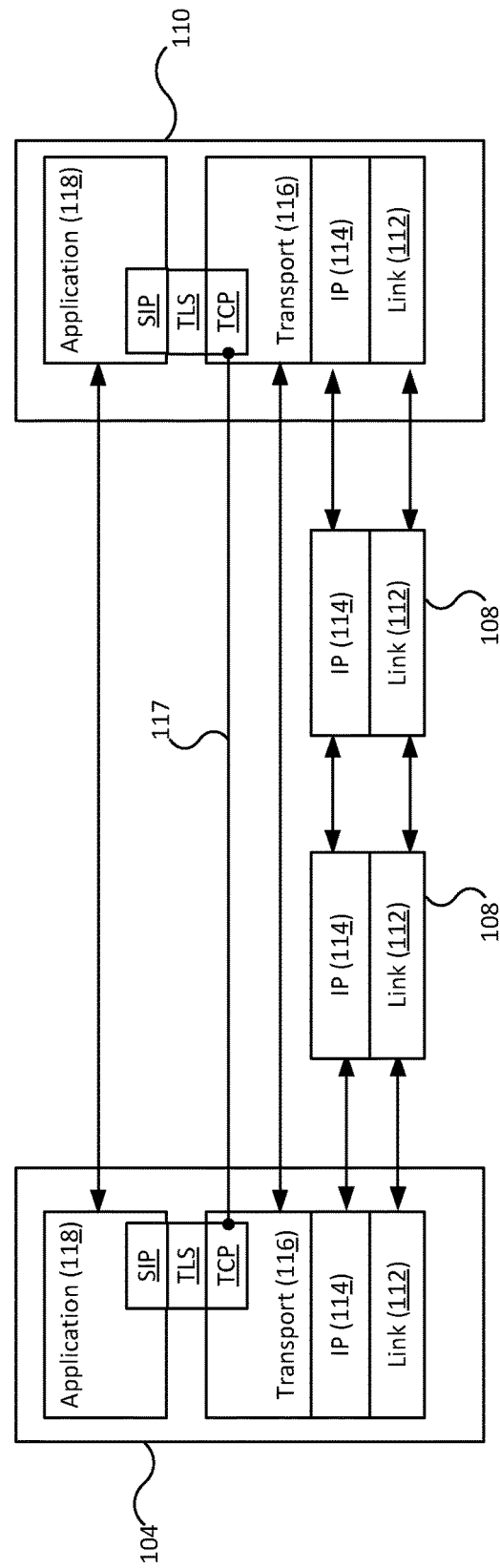
FIG. 1A shows how a TCP connection may be secured using TLS.

As illustrated in FIG. 1A, some existing call signalling techniques uses TLS (Transport Layer Security) for the signalling phase itself. A secure TLS connection 117 is established between an initiating device and a server, and all call signalling messages are sent via the secure connection 117. That is, the signalling messages between the initiating device and the server are transmitted via a secure TLS connection, in accordance with an application layer signalling protocol such as SIP. As is well known in the art, TCP is a reliable, connection oriented transport protocol (i.e. at the transport layer 116), whereas TLS operates between the transport layer 116 and the application layer 118—as illustrated in FIG. 1A.

Setting up the TLS connection 117 requires two exchanges of handshake messages: 1) a first TCP handshake between the client device 102 and the server 110 to establish a TCP connection between the imitating device and the server, and 2) a second TLS handshake to negotiate a TLS key for securing the TCP connection—the "TLS connection" 117 being the TCP connection when secured in this manner.

Some such call signalling techniques set-up the TLS connection 117 at the start of the signalling phase itself. For example, the secure connection 117 is established in response to a user 102 of the client device 102 selecting a call option at the client device 102. As a consequence, the call setup time is dominated by TLS handshakes which require multiple network roundtrips. That is, such techniques increase call set up times significantly.

Other such existing signalling techniques utilize a pre-established, background TLS connection 117 to the server 110—that is, a persistent secure connection 117 that is pre-established and maintained constantly, even when it is not needed. Whilst this can prevent call set up times from being increased, keeping the background connection fresh requires constant resources—both network bandwidth and processing resources at both the client device 102 and the server 110. That is, to maintain the background TLS connection 117, the client device 102 needs to consume both processing resources and network bandwidth continuously, as refresh messages need to be sent repeatedly to the server 110 to keep the connection 117 alive. This can for example result in higher battery drain (for mobile devices in particular), and wasted bandwidth and, moreover, creates significant additional load on the server receiving the refresh messages.

Another call signalling method uses unencrypted UDP for signalling. That is, call signalling messages are sent using UDP—an unreliable, connectionless transport protocol—but in an unencrypted form. This allows a fast call setup and does not require background connections to be kept alive, however the signalling is not secure.

As is known in the art, in practice TLS requires a TCP connection to operate reliably; it cannot operate properly over UDP.

In contrast to TCP, UDP is a connectionless transport protocol i.e. it is stateless in the sense that two devices can communicate using UDP without requiring any transport layer state to be maintained at either device, and without any associated transport layer handshakes. That is, UDP eliminate the TCP handshake. This makes UDP faster in some circumstances, the trade-off being that UDP is unreliable in the sense that delivery of UDP datagrams cannot be guaranteed: it provides no mechanism to tell a device, which has transported a UDP datagram, whether or not it has been successfully received (in contrast, TCP provides a system of acknowledgements and retries). This means that reliability, if desired, must be implemented elsewhere.

Figure 1B:
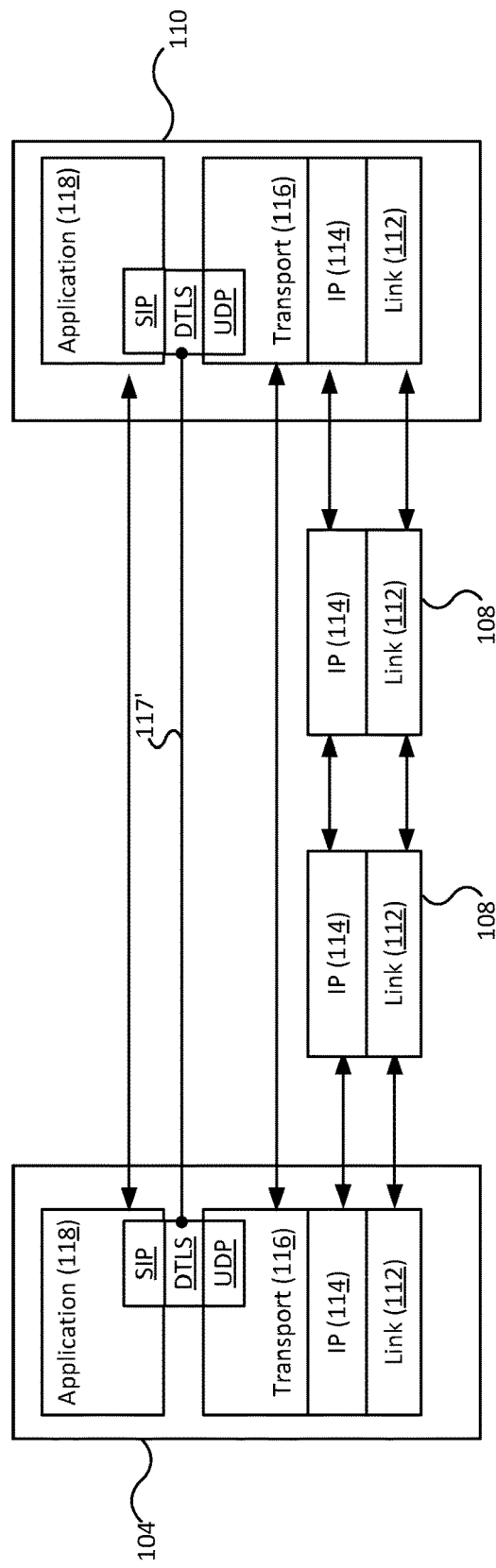
FIG. 1B shows how UDP communications may be secured using DTLS.

A modification of the TLS protocol, known as datagram TLS (DTLS) has been developed, with a view to allowing SIP and other protocols, such as RTP, to operate over DTLS and UDP—as illustrated in FIG. 1B. DTLS operates between the application layer 118 and transport layer 116 in the same way as TLS. As noted above, DTLS defines a handshake and a state machine. Thus, although DTLS operates over a connectionless transport protocol (UDP)—meaning there is no transport layer connection between the client device 102 and server 110 as such—when operating according to DTLS, a DTLS connection 117' between the client device 102 and server 110 is established by the DTLS handshake, and defined by DTLS state held at the client device 102 and/or server 110.

SRTP/SDES (secure RTP using Security Descriptions) is a known protocol that uses a secure signaling means (including secure connections) to exchange keys for encrypting UDP audio/video traffic; it's applied specifically to media (not signaling) and is not stateless: both parties store the encryption key for as long as the session remains active.

In embodiments of the present subject matter, the secure connection used to pre-negotiate the session key data is a secure transport layer connection established between the initiating device and the responding device via the network 108. That is, a secure, end-to-end connection at the transport layer 114. That is, an end-to-end TCP secured using a TLS key. Accordingly, a first TCP handshake is performed between the initiating device and communications controller the at the start of the pre-establishment phase to establish the TCP connection, and a second TLS handshake is performed between the initiating device and the communications controller to negotiate the TLS key used to secure this connection. This TLS handshake creates a TLS session between the initiating device and the communication controller, in which the session key data is negotiated.

Both handshakes require several network round trips, but because this is performed in the pre-establishment phase before the communication event is instructed (e.g. by the user of the initiating device), it does not increase the call set up time.

Note that this TLS key is separate and different from the session key data that is negotiated via the secure connection when established. That is, the TLS key is used to secure the session key negotiation messages, but it is not part of the session key data obtained as a result. The TLS key is used exclusively for the TLS session between the initiating device and the communications controller i.e. once this TLS session has been terminated, it is not used again. By contrast, the session key data obtained during this TLS session persists, and is used, after this TLS session has been terminated (in the communication event establishment phase)—up to several days after the TLS session has ended in some embodiments.

The TLS connection is terminated once the session key data has been obtained, and before the communication event establishment phase—up to several days before in some embodiments. The session key data is retained in the memory so that it can be used to encrypt payload during the communication event establishment phase. This reduces the amount of network and processing resources requires, as compared with existing techniques that rely on keeping a background TLS connection alive constantly.

The communication event establishment request is not sent via a secure transport layer connection—rather, security is provided by encrypting its payload using the pre-negotiated session key data.

In the described embodiments, the communication event establishment phase is connectionless where possible. That is, not only is the communication event establishment request not sent via a secure transport layer connection, where possible it is not set via any transport layer connection at all i.e. it is transmitted using a connectionless transport protocol, such as UDP. In the case that a connectionless transport protocol cannot be used for some reason, the request is sent via an unsecured transport layer connection, using a connection-oriented transport protocol, e.g. via a TCP connection or unsecured HTTP connection. Although a handshake is needs to establish the TCP/HTTP connection, no TLS handshake is needed to secure it, which still represents a call set up time saving.

In some of the embodiments described below, the session key data that is negotiated in the pre-establishment phase comprises:

an unencrypted version of a session key (or a pair of secrets that can be used to generate it)—this is (these are) transmitted via the secure channel; and an encrypted version of the session key, which has been encrypted using a wrapper key available to the communications controller. This can be transmitted via the secure channel, though that is not essential as it is already encrypted.

An additional effect provided in these embodiments is:

(iv) allowing stateless operation of the communications controller, in the sense that no session keys need to be stored at the communications controller at all.

The wrapper key is only accessible to the communications controller—it is never sent to the initiating device. The initiating device cannot decrypt the encrypted version of the session key—it effectively stores it on behalf of the communications controller. The unencrypted session key, negotiated in the pre-exchange phase via the secure channel, is used by the initiating device to encrypt message payloads. The encrypted version of the session key is included in each message sent in the later communication event establishment phase, along with the encrypted payload, and sent to the communications controller form the initiating device. This allows the communications controller to decrypt the session key using the wrapper key, and then decrypt the payload itself using the decrypted session key. Thus all the communications controller needs to retain is the wrapper key.

No security measures beyond the encryption based on the pre-negotiated session key data are needed in the communication event establishment phase—the encrypted session key can be safely transmitted from the initiating device to the communications controller using non-secure means—e.g. using UDP, or via an otherwise unsecured TCP e.g. HTTP/TCP connection—as it is already encrypted with the wrapper key. Note that "otherwise unsecured" connection in this context means a connection which is not secured using any means other than the encryption of message payloads based on the pre-negotiated session key data (e.g. TLS, for example HTTPS).

Because the initiating device retains the encrypted session key and sends a copy in each message, there is no need for the communications controller to store its own copy. This reduces the amount of back-end storage that is needed to implement the communications controller, and provides additional security as it avoids the need for any central session key repository at the communications controller (the communications controller will generally serve numerous client devices, and in this case the only copies of the session keys that exist are the encrypted versions distributed amongst the client devices).

In others of the embodiments described below, the session key data that is negotiated in the pre-establishment phase comprises:

an unencrypted version of a session key (or a pair of secrets that can be used to generate it)—this is (these are) transmitted via the secure channel; and an identifier (ID) of the session key.

In these embodiments, the communications controller does retain a version of the session key itself, in association with the identifier. The operation is similar in these embodiments—however, in this case the session key ID is included in each message sent in the later communication event establishment phase with the encrypted payload, in place of the encrypted session key. Again, no secure connection is needed in the communication event establishment phase—the session key ID can be safely transmitted from the initiating device to the communications controller using non-secure means (e.g. using UDP, or via an otherwise unsecured TCP connection), as the session key identifier ID itself cannot be used to decrypt the payload.

For the avoidance of doubt, note that the term "unencrypted" as used herein (including in the Claims) refers only the wrapper key, and does not exclude other types of encryption. That is an "unencrypted version of a session key" means a version not encrypted with the wrapper key, and thus includes session keys encrypted by other means provided this encryption is reversible by the initiating device.

The session key identifier may be generated by the communications controller and transmitted to the initiating device, or the initiating device may generate the session key identifier and transmit it to the communications controller, for example the identifier may be a GUID (globally unique identifier), in the pre-establishment phase.

In the embodiments described below, the communication event establishment request—sent in the communication event establishment phase—identifies the responding device, whereby transmitting the communication event request to the communications controller causes the communications controller to decrypt the encrypted request payload and transmit a communication event invite to the responding device identified in the decrypted payload.

The pre-negotiation may for example be performed during an installation of a communication client on the initiating device, as part of the installation process; when the communication client is first run on a processor of the initiating device; and/or according to predetermined session key negotiation schedule, e.g. such that fresh session key data is obtained, say, once a day or every few days. In some embodiments, the session key data is retained after the communication event has terminated, and reused for one or more later communications events. That is, the same session key data may be used for multiple communication events. The session key data is used to encrypt a request payload of the communication event request transmitted from the initiating device to the communications controller during the communication event establishment phase. The communications controller is able to decrypt the encrypted request payload, allowing the communication event between the devices to be established based on the decrypted payload.

The communication event establishment request is transmitted in direct response to the communication event establishment instruction. For UDP (no handshake), this means the very first packet to be transmitted from the initiating device to the communications controller following the communication event establishment instruction is a UDP datagram encapsulating at least part of, and in some cases the entirety of, the request (as no e.g. DTLS handshake is necessary). For unsecured TCP, the very first packets to be exchanged between the initiating device and the communications controller are TCP handshake messages—however, once the TCP handshake has been completed to establish an unsecured TCP connection between the initiating device and the controller, the next packet to be sent is a TCP packet encapsulating at least part of the request (as no e.g. TLS handshake is necessary).

The communication event establishment instruction may be instigated manually by a user input at the responding device, whereby the communication event establishment message is transmitted in direct response to the user input.

In the communication event establishment phase, the request comprising the encrypted payload is transmitted, where possible, using an unreliable transport protocol (e.g. UDP) and, moreover, in a single datagram of the unreliable transport protocol (e.g. single UDP datagram), using novel compression techniques described below.

Among other things, the present disclosure provides a novel signalling protocol based on UDP with a custom data encryption and authentication protocol to achieve zero-RTT (round trip time) for call initiation.

Figure 2:
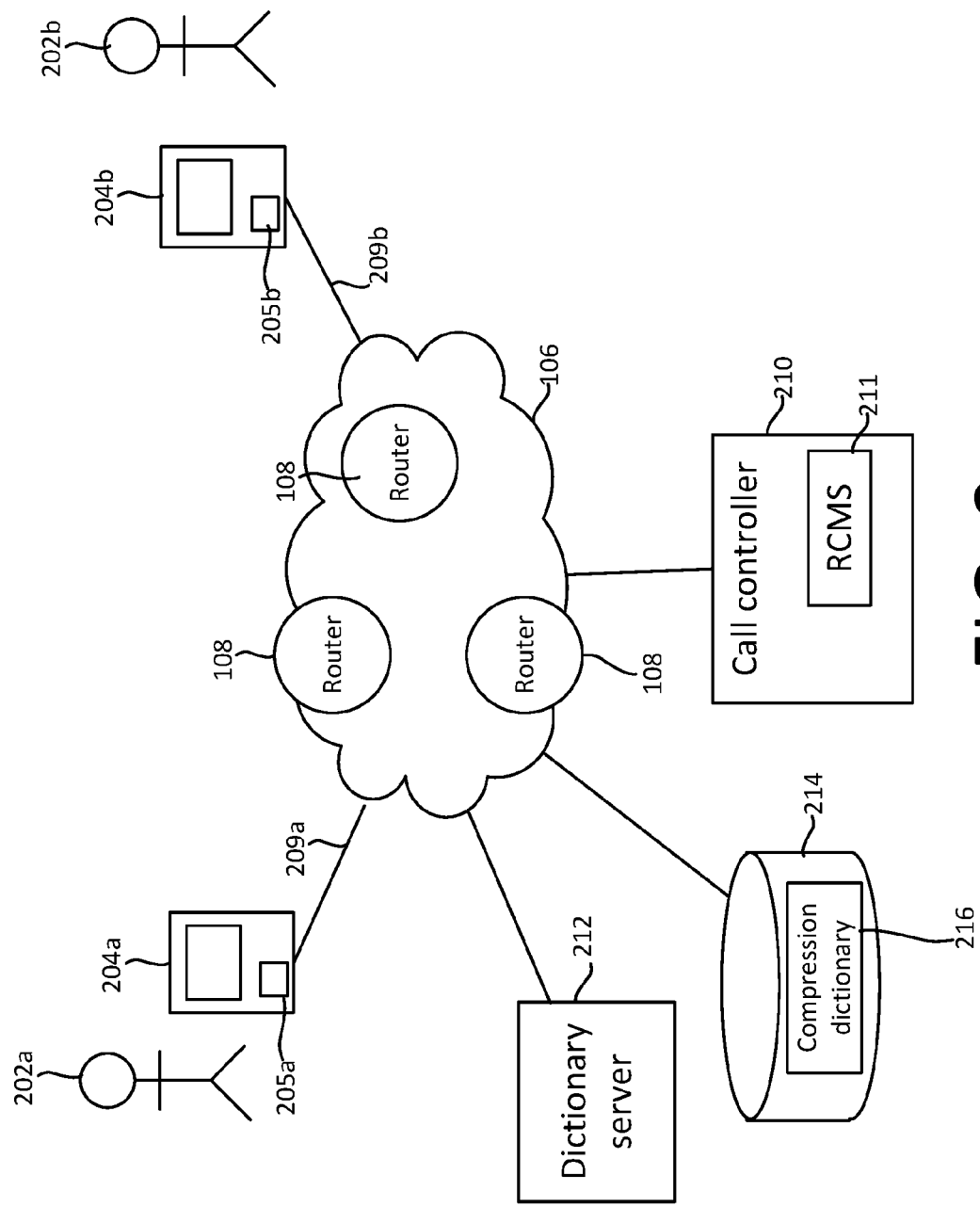
FIG. 2 shows a block diagram of a communication system in which embodiments of the present subject matter may be implemented.

FIG. 2 shows a communication system in accordance with various embodiments of the present subject matter. The communication system comprises the internet 108; a first user device 204a operated by a first user 202a and executing a communication client 205a; a second user device 204b, operated by a second user 202b and executing a communication client 205b; and a communications controller, which is a call controller 210 in this embodiment. The call controller may be a server, though in the present example it is a server pool (see below).

Each user device 204a, 204b is connected to the internet 102 via a respective physical layer connection 209a, 209b that allows the client 204a/204b to access the network 102—for example a Wi-Fi, cellular, Ethernet connection or any other form of physical connection, at the link layer 102 of the internet 102 (specifically a physical layer of the link layer 102, corresponding to OSI L1). Physical connections offer various levels of security (e.g. password-protected vs open Wi-Fi)—it is assumed that this level of security is insufficient. That is, the present techniques do not rely on any form of link layer security.

The network 108 is a packet routed network. Packet routing is available over that physical connection, and provided at the network layer 104 by the routers 108. For example, using IP (Internet Protocol). Indeed, the use of IP is so widespread that network layer 304 is often referred to as the IP layer.

To establish a call between the user devices 204a, 204b, various messages are transmitted and received between: the client 205a and the call controller 210, and the call controller 210 and the client 205b in a call establishment phase ("call signalling phase"). Messages are not exchanged between the user devices 205a, 205b directly in the call signalling phase in the described embodiments. Among other things, the purpose of the call signalling phase is to negotiate media parameters, to allow audio and/or video data to be transmitted and received between the clients 205a, 205b in a subsequent media flow phase—e.g. using VoIP (Voice over IP). No audio or video data is exchanged between the user devices 204a, 204b in the call signalling phase.

Embodiments are described in the context of the first user 202a using their user device 204a to place a call to the second user 202b. In this context, the first user device 204a is referred to as the initiating device or calling device, and the second user device 204b as the responding device or callee device; the first user 202a being a caller, and the second user 202b being a callee.

As indicated above, prior to the call signalling phase, the calling client 202a—in a pre-call establishment phase—obtains session key data, used to encrypt messages sent to the call controller 110 in the call signalling phase. The pre-call establishment phase may for example be performed when the client 202a is first installed on the calling device 202a, and thereafter according to a key rotation schedule (session key negotiation schedule), e.g. once every day or once every few days.

Only two users 202a, 202b of the communication system are shown in FIG. 2, but as will be readily appreciated there may be many more users of the communication system, each of whom operates their own device(s) and client(s) to enable them to communicate with other users via the communication network 2.

Figure 2A:
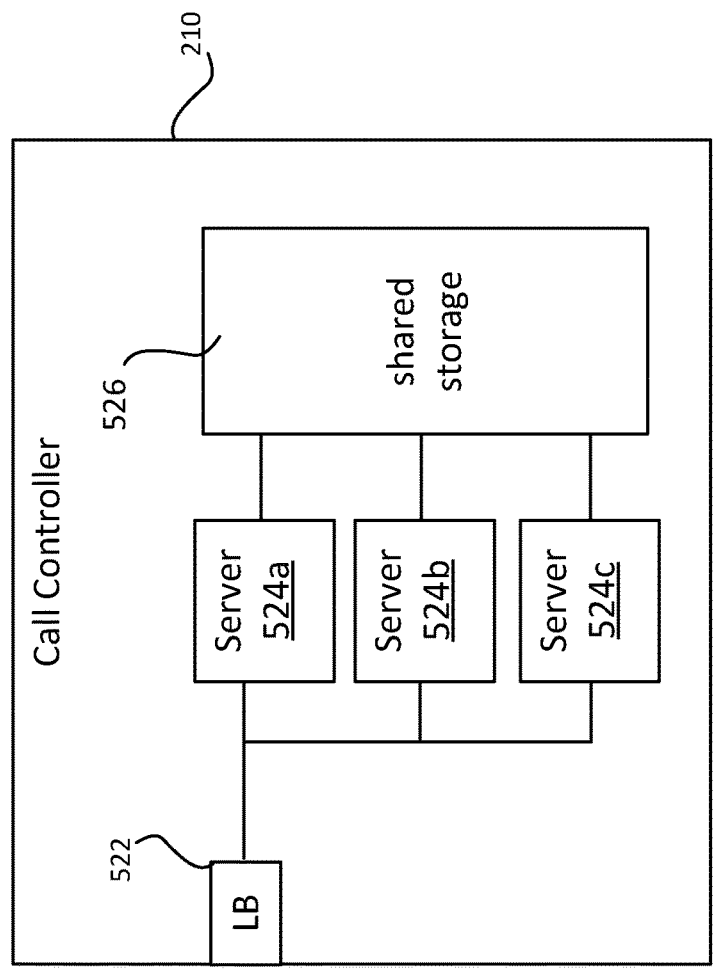
FIG. 2A shows an exemplary call controller, in the form of a server pool.

FIG. 2A shows one exemplary configuration of the call controller 210, which is a server pool in this example, equivalently referred to as a server cluster. That is, the call controlled 210 comprises a plurality of server 524a, 524b, 524c, each connected to a load balancer 522. Three servers are shown by way of example, but the call controller may comprise any number of servers. The servers 524a, 524b, 524c may be physical servers (i.e. different server devices) or virtual servers running on the same or different physical devices. For example, each of the servers may be a server instance on a cloud platform such as Windows Azure. The servers 524a, 524b, 524c have access to a shared electronic storage 526. The shared electronic storage 526 can be any form of distributed store, which is accessible by all the servers 524a, 524b, 524c of the cluster/pool. Requests directed to the call controller 210 are received by the load balancer 602, and can be directed to any one of the servers 524a, 524b, 524c. Any one of the servers can handle any request, as they all share the same cache 528.

Figure 3:
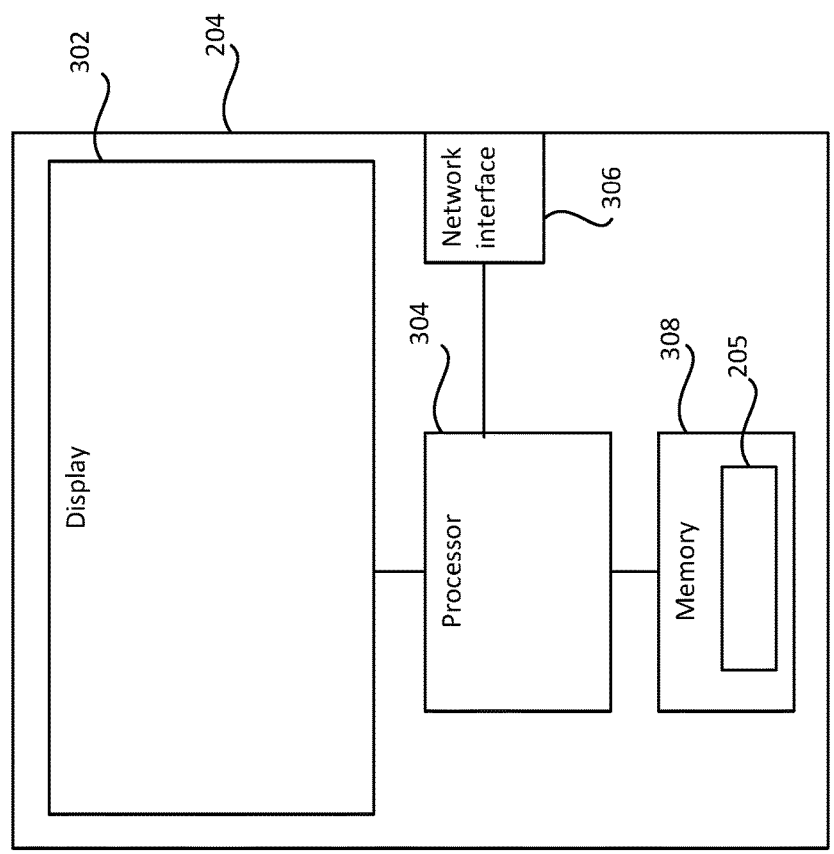
FIG. 3 shows a block diagram of a user device.

FIG. 3 shows a block diagram of a user device 202 (e.g. 202a, 202b). The user device 202 is a computer device which can take a number of forms e.g. that of a desktop or laptop computer device, mobile phone (e.g. smartphone), tablet computing device, wearable computing device (headset, smartwatch etc.), television (e.g. smart TV) or other wall-mounted device (e.g. a video conferencing device), set-top box, gaming console etc. The user device 202 comprises a processor 304, formed one or more processing units (e.g. CPUs, GPUs, bespoke processing units etc.) and the following components, which are connected to the processor 304: memory 308, formed on one or more memory units (e.g. RAM units, direct-access memory units etc.); and a network interface(s) 306. The user device 202 connects to the network 106 via its network interface 306, so that the processor 304 can transmit and receive data to/from the network 106. The network interface 306 may be a wired interface (e.g. Ethernet, FireWire, Thunderbolt, USB etc.) or wireless interface (e.g. Wi-Fi, Bluetooth, NFC etc.). Any of these components may be integrated in the user device 6, or external components connected to the user device 6 via a suitable external interface.

The memory 308 holds a communication client 205 (e.g. 205a, 205b) for execution on the processor 304. The client 205 may be e.g. a stand-alone communication client application, plugin to another application such as a Web browser etc. that is run on the processor in an execution environment provided by the other application. The client 205 has a user interface (UI) for receiving information from and outputting information to a user of the device 204. The user interface may comprise, for example, a Graphical User Interface (GUI) which outputs information via the display 302 and/or a Natural User Interface (NUI) which enables the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

Figure 4:
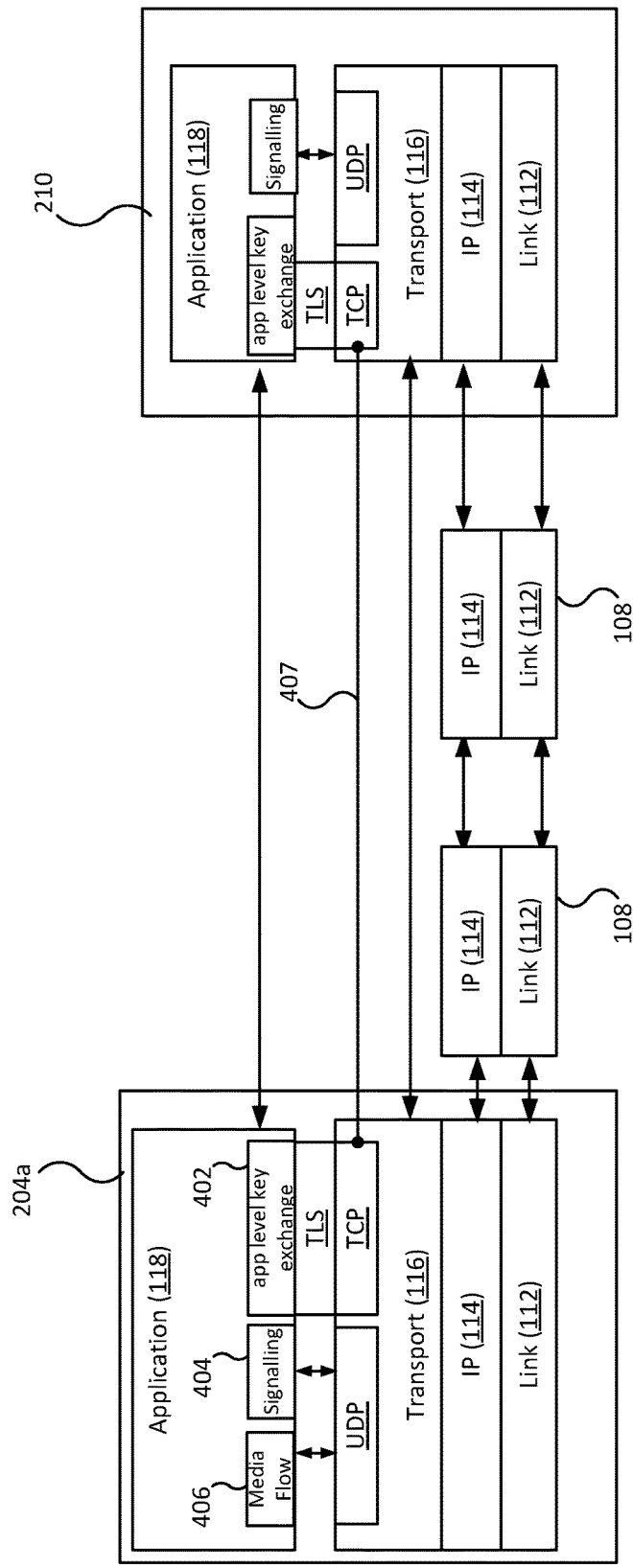
FIG. 4 shows how functionality may be implemented by an initiating device at different architectural layers of a packet based network.

FIG. 4 gives a high level overview of when and where certain procedures are implemented by the calling client 205a. Some of these are known protocols, whereas others are novel procedures provided by the present disclosure. Like reference numerals in FIG. 4 denote features corresponding to those in FIGS. 1A and 1B.

Block 402 is shown at the application layer 308 of the calling device 202a, which represents an application layer key exchange performed by the calling client 205a in the pre-call establishment phase. The application layer key exchange 402 is performed over TLS and TCP, as shown.

In the application layer key exchange of block 402, IP is used to establish a logical, network layer connection 407 at the transport layer 306—such as a TCP connection—for the pre-call establishment phase; this connection is end-to-end between the client 205a and the call controller 210. The end-to-end connection 407 require times and packet roundtrips to set up, and in practice needs periodic maintenance in most networks.

Over the network layer connection 407, security is added using TLS in this example, though other types of security protocol can be used instead. As noted, such security protocols operate in between the transport layer 306 and application layer 308, as shown in FIG. 4. These add more network roundtrips after connection establishment, but in exchange provide confidentiality and data integrity even if the underlying physical layer network is not secure.

A transport layer connection when secured in this way is referred to as a secure connection (e.g. TLS connection). Securing the connection connections involves a key exchange phase and optionally an authentication phase as part of connection setup, which produce a connection encryption key (e.g. TLS key) used to secure data sent over that connection.

As noted above, some existing call signalling existing techniques are reliant on a long-lived secure connection using TLS that is—in contrast to the present subject matter—kept active for a long time, so that the call signalling can be conducted over this connection. The connection is maintained in the background, which requires packets to be sent every few minutes or seconds. Any time the underlying physical connection changes (e.g. when a phone switches from Wi-Fi to cellular), the TLS connection is re-established.

The embodiments of the present subject matter described herein also set up a secure connection 407, by performing e.g. a standard TLS key exchange, certificate validation etc., to obtain a connection encryption key e.g. TLS key.

The secure connection 407 is established in the pre-call establishment phase and, instead of using this connection for the signaling itself, the application level key exchange 402 is performed over the connection 407—generating another key ("session key") and a ticket containing an encrypted version of the session key or an ID of this session key (see below)—these are stored in the memory 308 of the calling device 104a, whereby the client 205a can access them as and when it seems them to initiate call signaling. The secure connection 407 is then torn down once the session key has been obtained. That is, the connection 407 is not maintained it or kept it active after the session key has been obtained—this means there is no background traffic and no battery drain.

For the avoidance of doubt, it is once again noted that the "connection encryption key" (e.g. TLS key) is separate and different from the "session key" used in the call signalling phase. The connection 407, once secured with the connection encryption key, is used to pre-negotiate the session key;

but it is the obtained session key that is used to encrypt messages in the call signalling phase, by which time the connection 407 has been torn down to save resources. Once the connection 407 has been torn down, the connection encryption key becomes redundant and can be discarded entirely.

Block 404 in FIG. 4 is also shown at the application layer 308 of the calling device 202*a*, and represents a novel call signaling procedure performed by the client 205*a*, at a later time, in the call signaling phase based on the pre-negotiated session key obtained through the application layer key exchange of block 402. The process of block 404 comprises, in response to a call establishment instruction (e.g. instigated by the caller 202*a* selecting an option via the UI of the client 205*a* to call the callee 202*b*) using the pre-negotiated key and ticket, in combination with a connectionless transport protocol such as UDP, to send and receive encrypted messages between the client 205*a* and the call controller 210.

UDP is built directly on top of IP, and therefore can function as soon as the physical connection is available; there is no need to establish transport layer connections for it. Where e.g. UDP is unavailable, an insecure network layer connection (TCP or a higher-level protocol such as HTTP) can be used instead of UDP. Messages are encrypted in the same way using the pre-negotiated session key—which provides a form of secure connections that require no additional roundtrips on top of what's needed to establish the standard insecure transport layer connection (e.g. TCP without TLS, e.g. HTTP rather than HTTPS). UDP may be unavailable when user's network environment blocks UDP communication for one of a number of reasons, or effectively unavailable due to extreme packet loss in very poor network conditions.

Block 406 shown at the application layer 308 of the initiating device 202*a* represents media data exchange processes, which may be used after the signaling phase has completed to transmit and receive audio and/or video data between the caller client 205*a* and the callee client 205*b*, based on media parameters negotiated during the call signaling. For example, based on VoIP using UDP.

Figure 5A:
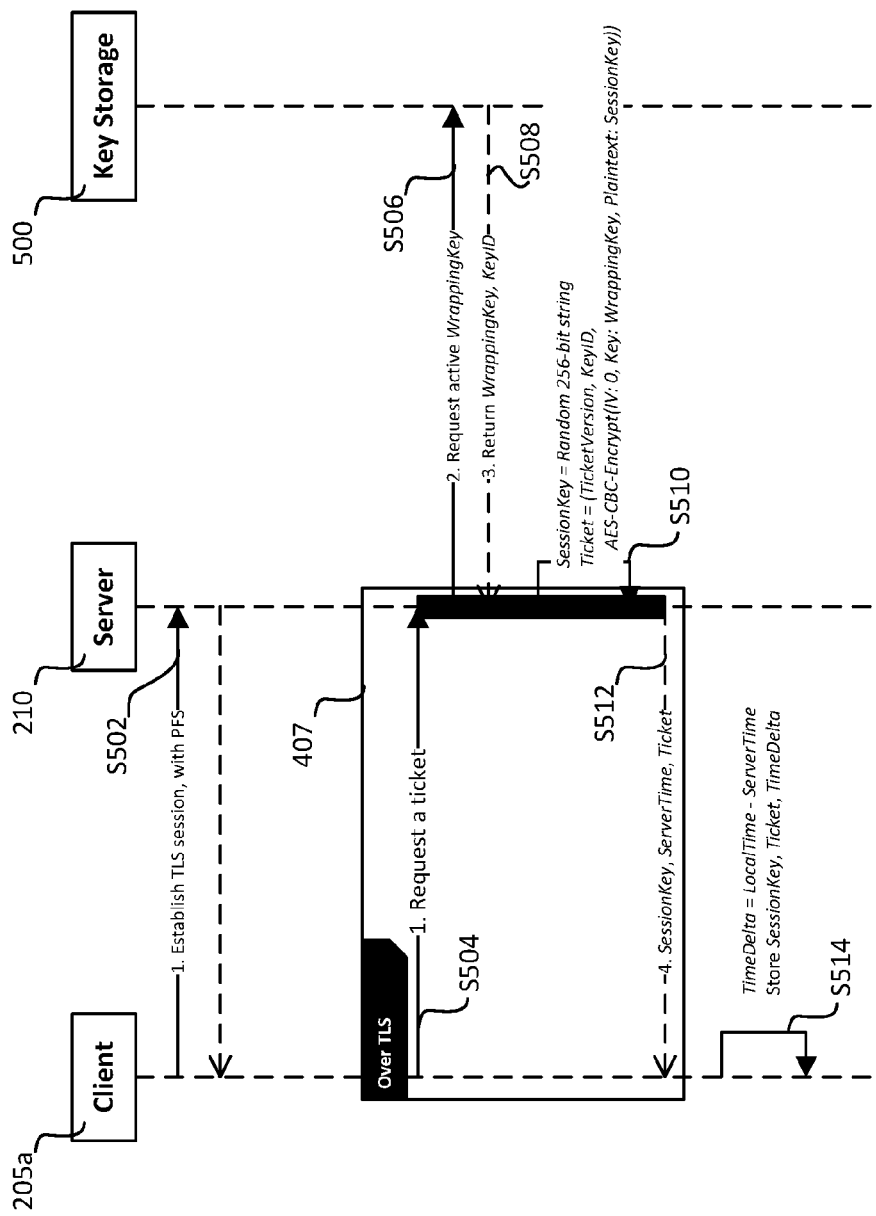
FIG. 5A shows a signalling diagram for a pre-call establishment phase.

FIG. 5A shows a signaling diagram for a pre-call establishment phase according to a first embodiment, in which the application layer key exchange of block 402 is performed periodically in the background to establish a shared "session key" a shared key which will be used during call setup. The most recent session key remains valid until the next time the procedure is performed.

At step S502, the TLS connection 407 is established between the client 205*a* and the call controller 210.

At step S504, the client 205*a* requests a session ticket form the call controller 210. In response, the call controller 210 generates a session key, which is a 256-bit cryptographically strong random sequence ("SessionKey").

At step S506, the call controller 210 requests, from a key store 500 implemented in the shared memory 526, a current wrapper key ("WrappingKey") and a wrapper key identifier of the current wrapper key ("WrapperKeyID").

At step S510, the call controller 210 encrypts the SessionKey with WrappingKey, using AES-256 in CBC mode (though in other implementations, a different algorithm may be used) with a zero initialization vector (IV), and creates a ticket ("Ticket") comprising WrapperKeyID and the encrypted SessionKey. The ticket may also comprise a version identifier ("Ticket Version"), denoting a current version of the signaling protocol, to provide support for new versions.

At step S512, the call controller 210 sends to the client the SessionKey, a current server timestamp, and Ticket. That is the call controller 210 sends both the encrypted version of the session key (in the ticket) and an unencrypted version of the session key for use by the client 205*a*. At least the unencrypted version of the session key is transmitted via the secure TLS connection 407, and in this embodiment so is the ticket and the server time stamp. The connection 407 is torn down once these have been received at the client 205*a*. The server time stamp denotes a current time as measured at the call controller 210.

At step S514, the client 205*a* computes a time difference between the server time and a current client time. The client 205*a* stores SessionKey, Ticket and the computed time difference in the memory 308, where it remains for use as an when it is needed in later call signaling.

SessionKey is only used to protect the communication of one client (i.e. 205*a*) with the call controller 210. The call controller 210 is a centrally-managed entity, and can be trusted to choose SessionKey without any security risk. Ticket is completely opaque to the client 205*a*, as the client 205*a* never has access to Wrapper Key.

A validity period of Ticket is determined by a Wrapping-Key rotation schedule and is e.g. on the order of several days. The validity period is determined by security restrictions applicable in the communication scenario. For example, in a military embodiment, it may be of the order of hours, rather than days.

At the end of the validity period, WrapperKey is destroyed completely e.g. after a few days (or less, depending on the circumstances), the server will not have access to key material necessary to unwrap contents of the Ticket, thus rendering Ticket unusable. One way of ensuring that the wrapper key can be deleted permanently is storing it only in volatile memory (permanency of deletion from volatile memory is guaranteed, unlike non-volatile memory, which is susceptible to data retrieval methods to restore deleted data). This provides forward secrecy for the call signaling (i.e. historic call signaling messages, even if nefariously recorded, can never be unlocked once the wrapper key has been deleted).

The complete destruction of WrapperKey at the end of the validity period can be ensured by only ever storing it in volatile memory. Thus, in some implementations, at least part of the key store 500 is implemented in volatile memory. That is, at least a portion of the shared electronic storage 526 may be in-memory storage (i.e. volatile memory), in which the wrapper key can be held.

The client can reuse the same Ticket for multiple calls, if it chooses a random IV for each message (see below). As is known in the art, an initialization vector (IV), sometimes referred to as a starting variable, is an input to cryptographic algorithm that provides uniqueness. A fundamental property of an IV is that it is unique for a given key. That is, no IV is used twice for the same key. Often an IV is randomized, i.e. random or pseudorandom, though depending on the cryptographic algorithm that is not always essential.

Alternatively, the client 205*a* may invalidate (destroy) Ticket after each call/session, and obtain a new one in preparation for the next call, in another pre-establishment phase performed before that next call is instructed. This mechanism renders it even more difficult for the attacker to gain anything of value by observing packets.

The Ticket may persist in the memory 308 even if the execution of the client 205*a* is terminated, and even if the initiating device 204*a* is powered down. Alternatively, the process of FIG. 5A may be performed each time the client 205a is executed i.e. each time a new instance of the client 205a is created on the processor 304.

FIG. 5B shows a signaling diagram for a subsequent call signaling process.

To communicate with the call controller 210 client performs following steps.

At step S516, the client 205a loads Ticket, SessionKey, and time difference from the memory 308.

At step S518, the client 205a generates request contents, which comprises:
- a random request identifier ("RequestID");
- A current timestamp ("TimeStamp") denoting a local current time measured at the calling device 504, adjusted for the difference between client and server time;
- a user authentication token for the user 202a; and
- a request message payload ("RequestPayload").

At step S520, the client 205a uses a key derivation function (KDF) to derive an encryption key ("EncryptionKey") from SessionKey. That is, from the unencrypted version of the session key. Any suitable key derivation function can be used to this end. The client 205a generates a cryptographically strong random 128-bit IV and encrypts the request contents using AES in CBC mode with initialization vector set to IV and the key set to EncryptionKey. This results in an encrypted ciphertext string ("Encrypted"). Note, as with the encryption of step S510, other implementations may use different cryptographic algorithms here, while following the flows described in this document.

The client 205a also derives a separate authentication key ("AuthenticationKey") from the session key using the KDF, concatenates [Ticket, IV, Encrypted], and computes a HMAC ("HMAC") as HMAC-SHA256 of the concatenated [Ticket, IV, Encrypted] string with the key set to AuthenticationKey. As is known in the art, HMAC means a keyed-hash message authentication code, and provides integrity protection of messages i.e. they can be used to determine when a massage has been tampered with or otherwise altered without decrypting it.

At step S522, the client 204a sends a request message comprising:
Ticket,
IV,
Encrypted, and
HMAC to the server.

That is, all four elements are included separately in the request message.

At step S524, the call controller 210 extracts WrapperKeyID from the Ticket, and obtains WrappingKey corresponding to WrapperKeyID from the key store 500 (S526) implemented in the shared cache. If there's no such key, then no further processing is performed and no error message sent. There may be no such wrapper key, for example, if the validation period has ended and the relevant wrapper key permanently deleted accordingly.

At step S528, the call controller 210 obtains SessionKey by decrypting the encrypted session key in Ticket with the WrappingKey obtained at S526.

The call controller 210 then derives EncryptionKey and AuthenticationKey from the decrypted SessionKey, and verifies the HMAC value by computing an expected HMAC using its own AuthenticationKey derived from SessionKey. If the expected HMAC does not match the HMAC of the request message received from the client 205a, no further processing is performed and no error message is sent.

If the expected HMAC does match the request HMAC, at step S530, the call controller 210 proceeds to decrypt Encrypted using AES in CBC mode with initialization vector set to IV and key set EncryptionKey (S523).

The call controller 210 then reads the described TimeStamp, and drops the drops request message if TimeStamp differs from a current time measured at the server by more than a first time interval (T1). As noted, TimeStamp was generated by the client 205a taking into account the time difference between the client 205a and the call controller 210.

The call controller 210 comprises a response caching message handler 211, which maintains, in the shared memory 526, a shared cache of recent processed requests covering a second duration (T2) i.e. the last T2 seconds, and drops request if its RequestID is already in this memory, where T2>=T1. When multiple copies of the request are sent (for reliability—see below), the RequestID can be used to ensure that only one is acted upon and duplicates are discarded.

At step S534, provided the request was received within T1 and there is no request with RequestID already in the shared memory, the call controller 210 processes the decrypted request contents, including RequestPayload and—provided certain timing constraints are met (see below)—generates a response message ("Response") comprising RequestID from the request contents, Timestamp, and a response message payload ("ResponsePayload"). Including RequestID in the response allows the client 205a to distinguish between multiple copies of the response, which may be sent for reliability (see below).

The call controller 210 also generates cryptographically strong random 128-bit IV and encrypts Response using AES in CBC mode with initialization vector set to IV2 and key set to EncryptionKey. This results in another encrypted cipher text string ("Encrypted2"). The call controller 210 computes another HMAC ("HMAC2") as HMAC-SHA256 of [IV2, Encrypted2]. The call controller 210 then sends HMAC2 and Encrypted2 to the client (S536).

The client 205a authenticates and decrypts data in the same manner.

All Requests contain a user authentication token, which authenticate source of request.

Replay protection is based on the following.

The call controller 210 utilizes shared ephemeral storage (e.g. Redis) to keep necessary number of recent WrappingKey-s. Each server of the call controller 210 is provisioned with asymmetric keypair (RSA, 2048 bits). WrappingKey in ephemeral storage is encrypted with servers' public key (RSA-OAEP padding). Network access to ephemeral storage is via TLS only and authentication is based on either client TLS certificates or Azure Active Directory (for example). Additionally, there is a dedicated mechanism for automatic and periodic scheduled key rotation. Service performing key rotation encrypts newly generated cryptographically secure random 256-bit key using servers' public key and places result into ephemeral storage. It can also optionally notify servers about key rotation or servers can notice this on their own by periodically polling ephemeral storage. Keys may for example be rotates every one to four hours and, maintaining those keys covering the last 7 days.

Note: no attempt is made to explicitly authenticate the Ticket value. The decrypted SessionKey is immediately used—in form of the derived AuthenticationKey—to validate the HMAC on the request ciphertext. If the Ticket has been modified, HMAC verification will fail and the key will not be used to decrypt the message body. If the message HMAC check is modified in the future, special measures must be taken to ensure that the decrypted Payload is authenticated before using it.

In a variation of the first embodiment, ticket acquisition is performed ahead of time and is runs over a proper TLS connection between client and server. The process comprises the following steps:

1. The client 205a generates 256-bit cryptographically strong random sequence (ClientSecret) and sends in to the call controller 210 (over TLS connection 407).
2. The call controller 210 generates 256-bit cryptographically strong random sequence (ServerSecret), and XORs it with ClientSecret to obtain SessionKey.
3. The call controller 210 obtains current WrappingKey and its WrapperKeyID.
4. The call controller 210 wraps (i.e. encrypts) SessionKey using WrappingKey and creates a Ticket containing KeyID and wrapped SessionKey.
5. The call controller 210 sends to the client 205a ServerSecret, current server timestamp, and Ticket (over the TLS connection 407).
6. The client 205a computes SessionKey by XORing ClientSecret and ServerSecret, computes time difference between server time and current client time; it then stores SessionKey, Ticket and computed time difference.

That is, in the second embodiment, SessionKey is computed by combining entropy from both parties to protect from potential problems. Thereafter, the subsequent call signaling phase proceeds in the same manner.

The above steps are performed for each request and response exchanged between the client 502a and the call controller 210.

Figure 5C:
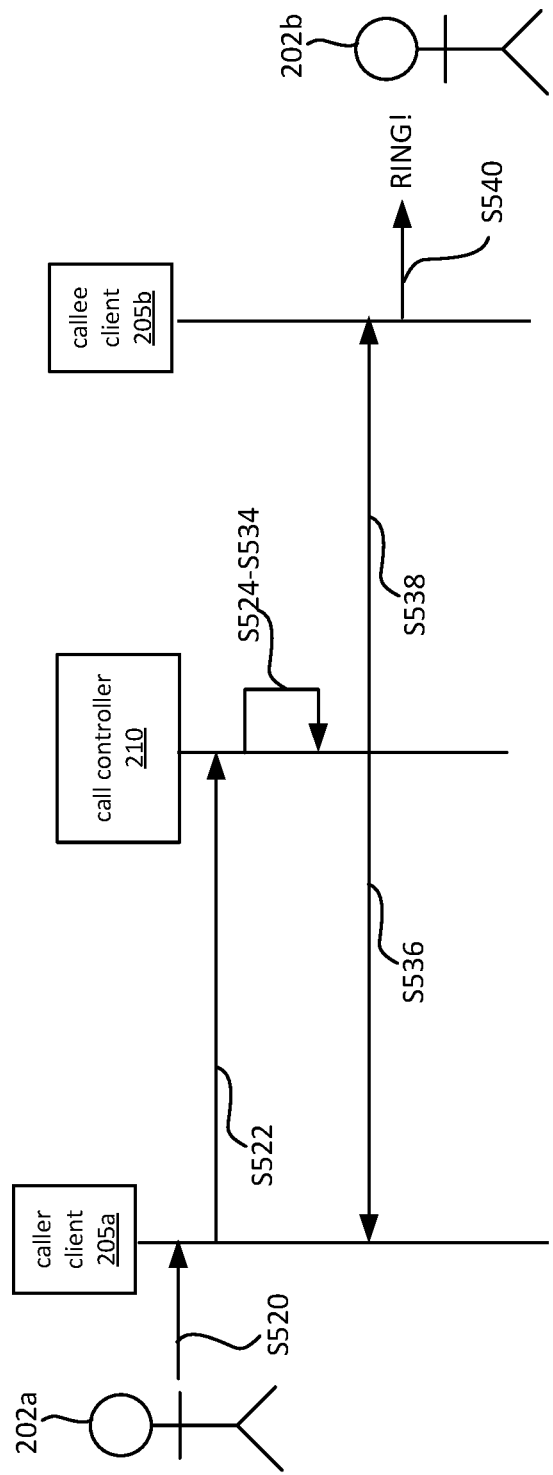
FIG. 5C shows additional signalling performed for the first request sent in the call establishment phase.

As shown in FIG. 5C, for the first request sent from the client 205a to the call controller 210, the RequestPayload identifies the responding device 204b. For example, it may comprise a user identifier of the second user 202b, a device identifier or network address of the second device 204b, or any other identifier that allows the call controller 210 to identify the responding device 204b. The first request is transmitted in direct response to a call establishment instruction S520 received by the initiating client 205a, for example from the caller 202a. Subject to steps S524-S534 set out above, the call controller—in addition to the transmitting a response to the caller client 205a at step S536—also transmits a call invite (at step S538) to the client 205b on the responding device 204b identified in the payload of the first request. This causes the responding client 205b to enter a ringing state (S540) to notify the callee 202b of the incoming call.

A feature of the key exchange mechanism of block 402 in the first embodiment is that it's stateless on the call controller 210: the call controller 210 does not need to store the session keys or any per-user data; all it needs is the wrapper key which is independent of the user. This allows the key distribution server to easily scale to large numbers of users.

In a second embodiment, the call controller 210 does store its own version of the session key. Rather than sending an encrypted session key to the client, the client 502a or the call controller 210 generates a session key ID of the session key, e.g. GUID (Globally Unique Identifier), and the session key ID is used in place of the encrypted version of the session key in the Ticket.

The version of the session key stored at the server may be an encrypted version (encrypted with the wrapper key), in which case forward secrecy can be provided by storing the wrapper key in volatile memory only, so that once the wrapper key is deleted form the volatile memory the encrypted version of the session key becomes permanently unusable irrespective of where it is stored. Alternatively, the version stored at the server may be an unencrypted version, in which case forward secrecy can be provided by storing the unencrypted version of the session key in volatile memory only, so that it can be deleted permanently.

As noted, the techniques described above provide:
Authentication—both at the user level—with the user tokens—and at the message level—through the integrity protection provided by the HMACs.
Confidentiality—it is not be possible to identify the callee or read session parameters by observing the packets, or extract the media encryption keys carried by them, because of the encryption based on the session key. Moreover, forward secrecy is preserved.

UDP is preferred in this context, as it provides the fastest signalling due to the absence of handshakes. However, as noted, it is unreliable—the techniques set out below compensate for this using a combination of data compression and protocol fall back.

2) Data Compression and Protocol Fallback

In addition to the above encryption, a combination of data compression and protocol fall back is used to ensure reliability—even when an unreliable transport protocol such as UDP is used. That is, to ensure that signalling can function in the presence of moderate packet loss, or in the case UDP connectivity is completely unavailable.

UDP fragmentation is not always available (e.g. it is unavailable in Windows Azure). When UDP fragmentation is unavailable, it is up to a developer to implement their own application-level message fragmentation and reassembly mechanism would be needed. This is cumbersome and resource-intensive, however the present techniques obviate the need for this by compressing each message to fit it in a single UDP datagram whenever possible, so that no application layer fragmentation and reassembly mechanism is needed. The path MTU (Maximum Transmission Unit) defines the maximum size of message that can be encapsulated in a single UDP datagram.

In the event that:
UDP is not available (e.g. due to UDP blocking in a firewall), or
any message cannot be compressed to fit into a single UDP packet the system falls back to a non-preferred protocol for signalling, for example:
TCP, e.g. HTTP/TCP.

To deal with packet loss when using UDP, every request and response is transmitted multiple times, e.g. 2-3 copies of each request and each response may be transmitted. The RequestID described is used to deduplicate requests and avoid processing them multiple times; responses are always matched to a table of outstanding requests in the shared storage 526 so duplicate responses will be automatically ignored.

If a request times out over the preferred protocol, e.g. UDP, the client 205 a will automatically retry transmitting the same request using the non-preferred protocol, e.g.
TCP, e.g. HTTP secured using the pre-negotiated session key data—at the cost of a TCP handshake to establish a TCP connection.
TCP can be used without TLS when the above described encryption techniques are used, e.g. over HTTP without additional encryption, as the message payload is already encrypted using the pre-negotiated session key. In other implementations, however, it may be appropriate to fall back to TLS e.g. HTTPS, at the cost of a TCP handshake and an additional TLS handshake.

Alternative implantations may establish an e.g. TLS connection in parallel with the UDP signaling every time as a fall back. In this case, the cost of the handshake is only incurred if the TLS channel wasn't ready by the time of the protocol change. In normally circumstances, this would generally be wasteful (and bandwidth competing), and may choke the network available to device if the network conditions are constrained. Nevertheless, it may be appropriate in some limited circumstances.

The response caching message handler 211 of the call controller 210 will allow the client to retrieve the response on the retry if it was previously lost—irrespective of the transport layer protocol used to send it. The message handler 211 is configured so that, when a fallback from UDP to HTTP(S) occurs, in the event that the original UDP message did reach in fact the server, then the server will correctly understand the HTTP message to be a retry, and respond with the same response that it would have sent over UDP, appropriately transforming it to be a valid HTTP payload if needed. In other words, the message handler 211 is configured to identify messages as duplicates of one another (based on the request IDs) irrespective of the transport protocol over which they were sent. The call controller 210 will attempt to respond to a request using the preferred protocol (e.g. UDP) unless it is unable to do so due to the size of the repose (see below) or until a duplicate of that request is received using the non-preferred protocol—in response to either event, the call controller 210 will fall back to the non-preferred protocol (e.g. HTTP(S)).

2a) Protocol Fallback

In the described embodiments, call setup time is reduced on average by using UDP for the initial communications signaling phase whenever viable, with robust fallback mechanism to ensure minimal disruption whenever call signaling over UDP is not viable.

UPD is connectionless and thus inherently faster than connection-oriented TCP because UDP forgoes the time-consuming handshake needed to establish a TCP connection. However, UDP is also unreliable, in the sense that safe receipt of a transmitted UDP datagram cannot be guaranteed. This is because UDP also forgoes the built-in acknowledgement and retry mechanisms of TCP that make TCP a reliable protocol.

In many contexts where UDP is currently used, this unreliability is acceptable. For example, where transmitting audio or video data over UDP to a receiving device in the subsequent media flow phase of a call, it is acceptable for some audio and video data to be irrevocably lost in transit, provided the amount of distortion this creates in the audio/video output at the receiving device is tolerable to a user.

However, the preceding call signaling phase is fundamentally different to the media flow stage—in this context, it is critical that at least one copy of every call signaling message makes it to the intended entity, be that the initiating device, responding device or call controller. If any message is lost altogether, the call signaling phase is liable to be delayed significantly or even fail altogether, unless message loss is properly handled. For this reason, TCP is often favored for call signaling, and is the most commonly used transport protocol for SIP.

The present disclosure recognizes that, without proper management, the inherent fastness of UDP will not translate into reduced call set-up times in all real-world scenarios. That is, the present disclosure recognizes that one cannot simply perform call signaling over UDP in the glib expectation of universally reduced call set up times: whilst in many circumstances, performing call signaling over UDP is viable and will result in significantly reduced call set up times due to its inherent fastness, there are other circumstances in which attempting call signaling over UDP is not viable, i.e. because it could significantly increase call set up times or cause call signaling to fail altogether—leading to a poor user experience.

Accordingly the present disclosure provides various mechanisms to, on the one hand, ensure that UDP is used for call signaling whenever viable (resulting in faster call setup) and, on the other hand, quickly determine when UDP is not viable to prevent significant increases in call set up times or failure of call signaling in that event.

In the described embodiments, call signaling is always attempted using UDP initially—however, several levels of robustness are built into the system to balance the benefits of UDP signaling, in terms of reduced calls setup times, with its potential pitfalls:

A first level of robustness can optionally be provided by message duplication, whereby multiple copies of a message are re-transmitted repeatedly in very quick succession (of order every ~100 ms) using UDP. This makes the call signaling robust to light-to-moderate UDP datagram loss. In many circumstances, this first level of robustness is sufficient to ensure that call signaling can be successfully completed over UDP, with significantly reduced call set up times as a result.

A second level of robustness is provided by fast protocol fallback based on provisional responses (acknowledgements), transmitted at the application layer in the described embodiments. These allow the callee device to make a very fast provisional check as to whether or not UDP is viable for a given call signaling. A provisional response is transmitted by the call controller to the caller device in immediate response to a request from the caller device, before it has finished generating a final response, such that under normal conditions the initiating device can expect a provisional response to any request is sends within a short time interval, e.g. about 1-2 seconds. If no provisional response is received within this short time interval (e.g. due to heavy packet loss or UDP blocking, for example), the caller device can immediately fall back to reliable TCP and re-transmit its request over TCP. In this situation, the call set-up time is increased—but only marginally i.e. by about 1-2 seconds.

If a provisional response is received in this short time interval, the initiating device provisionally concludes that UDP is viable, and continues with UDP. A third level of robustness, which is effectively a fail-safe mechanism, ensures that the initiating device can still fallback to reliable TCP in a reasonably timely fashion (of order 10-15 seconds) in that event, should it transpire that UDP is not viable.

Whilst TCP and UDP are used herein as examples of preferred and non-preferred networking protocols, the disclosure is not limited in this respect and the underlying principles of the present teaching apply more generally to other networking protocols. In this respect, the term "preferred networking protocol" refers generally to any networking protocol at any network layer, according to which session-based communications are initially attempted but which is liable to fail in certain circumstances. The term "non-preferred protocol" refers generally to any networking protocol that can substitute the preferred protocol and that is more likely to succeed in at least some of those circumstances.

A preferred protocol may for example be any connectionless and/or unreliable transport protocols, and a non-preferred protocol may for example be any other connection-oriented and/or reliable transport protocol, though the present teaching is not limited to this.

Figure 6:
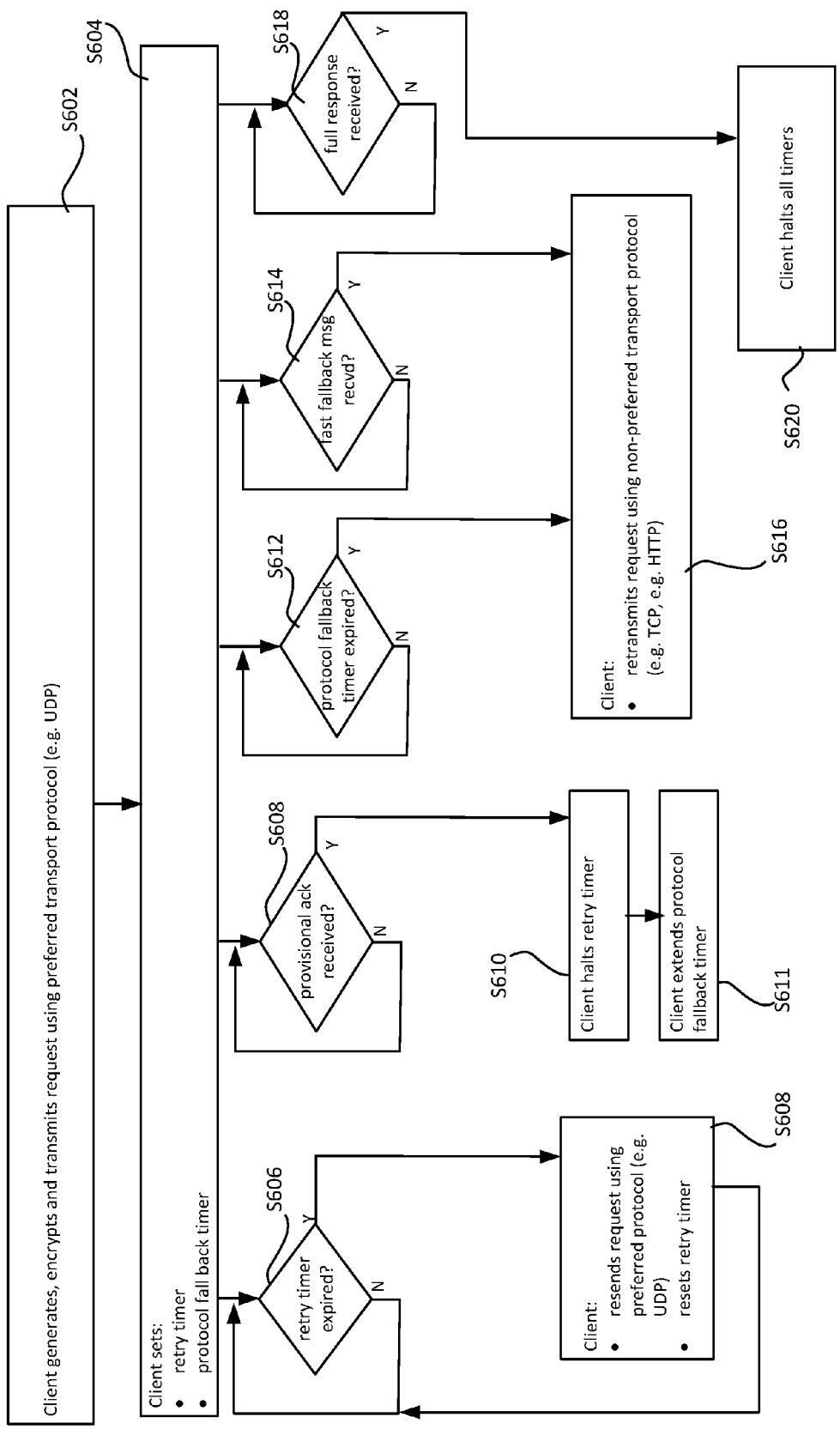
FIG. 6 shows a flowchart for a protocol fall back process.

FIG. 6 shows a flow for a method of sending a request from the client 205a to the call controller 210.

At step S602, the client 205a generates a request comprising an encrypted payload for transmission to the call controller in accordance with steps S516-S520 of FIG. 5B, and transmits it to the call controller 210 as in step S522 of FIG. 5B.

At step S604, the initializes in the memory 308;
a retry transmission timer, and
a protocol fallback time, initially set to a longer starting time interval than the retry transmission timer.

The timers count down, and expire at the end of their respective time intervals. In this manner, the client 205a, from the sensing of a request in a UDP datagram, monitors an elapsed time since its transmission.

For example, the retry transmission timer may be set to approximately 100 ms, and the protocol fallback timer initially to e.g. approximately 1-2 seconds, though in some circumstances less than 1 second may be appropriate.

If and when the retry timer expires (S606), the client 205a retransmits the request using the preferred protocol (S608).

If and when the protocol fallback time expires (S612), the client retransmits the request according the non-preferred protocol e.g. TCP, e.g. HTTP/TCP (S616).

To speed up the fallback to the non-preferred protocol (e.g. TCP, e.g. HTTP), two special messages are used in addition to the request and response messages:

a provisional acknowledgement (provisional response)—sent by the call controller 210 as soon as it receives a UDP datagram containing a request from the client 205a. This is sent in parallel with commencing the request itself, before the processing has completed and irrespective of whether the request is accepted or rejected.

a fast fall back message—sent by the call controller 210 if it cannot fit its response to the client's request into a single UDP packet.

Both of these special messages, just like request and response messages, are transmitted multiple times with a small interval (e.g. ~100 ms) for reliability.

The provisional acknowledgement packet indicates to the client 205 that the request was received, and serves two functions. If and when a provisional acknowledgment of the client's request is received at the client 205a (S608), the method proceeds to step S610, at which the client 205a halts the request retransmission timer, ensuing that no more retires are attempted using the preferred protocol (e.g. UDP)—no more duplicate request packets are needed using UDP as the client now knows the call controller 210 had received one, and therefore knows that it is able to send UDP messages to the call controller 210.

Simultaneously, at step S611, the client 205a extends the protocol fall back timer. If the provisional acknowledge was not received in a short time (e.g. 1-2 seconds or <1 second), the client will fall back to the non-preferred protocol (e.g. TCP, e.g. HTTP/TCP) under the assumption that UDP connectivity is not working. This fall back timer is shorter than the maximum server side processing time for certain requests, so receiving the provisional acknowledgement increases the client's confidence in UDP connectivity and lengthens the timer to the typical values used for HTTPS timeouts (e.g. to 10-15 seconds). This means that the client will now wait for longer before falling back to the non-preferred protocol at S612.

The fact that a provisional acknowledgment has been received means the client can be sure that at least one of its UDP requests has been received at the call control 210. However, that does not guarantee that a full, i.e. non-provisional, response will make it from the call controller to the client, as the full response is also being sent by the call controller using unreliable UDP. For example, more severe packet loss may be experience in the direction from the call controller to the client for whatever reason, or some form of one-way UDP blocking may be in place between the client and the call-controller. The extended timer therefore provides a fail-safe—if the extended timer expires, the client will re-sent a copy of the request via e.g. HTTP(S) which, as noted above, will in turn cause the call controller 210 to fall back to HTTP(S) and resend its final response via HTTP(S), such that its arrival is guaranteed at the client due TCP's built-in retry mechanisms.

If at any time a fast fall back message is received from the call controller 210 (S614), the client 205a, upon receiving the fast fall back request message, immediately stops all timers and retries the request using the non-preferred protocol (e.g. TCP, e.g. HTTP/TCP). This allows the call controller 210 to retrieve the response, which is already cached in the response caching message handler of the call controller 210.

If at any time a full response is to the client's request is received by the client 205a (S618a), the client 205a halts all timers, as it known the response has now been received and processed by the call controller 210.

2b) Data Compression

To avoid implementing a complex application layer reassembly mechanism and potentially reducing reliability, every request and response is encapsulated where possible in a single UDP packet which is smaller than the most commonly observed path MTU values (e.g. 1200-1400 bytes). Certain requests are fairly large, a specialized compression scheme is used to compress them—such as Deflate (GZIP) with a custom, pre-defined dictionary ("compression dictionary"). That is, a known compression function is used with a custom, pre-defined compression dictionary.

Figure 8A:
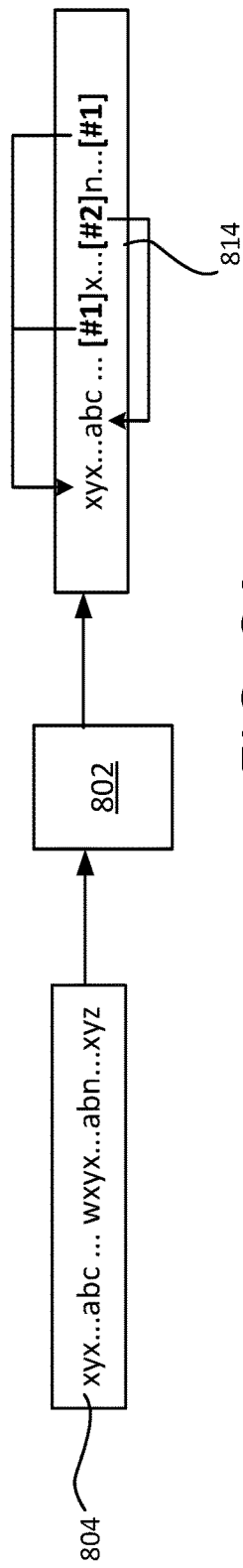
FIGS. 8B and 8A demonstrate the operation of a compression function, with and without a compression dictionary respectively.
Figure 8B:
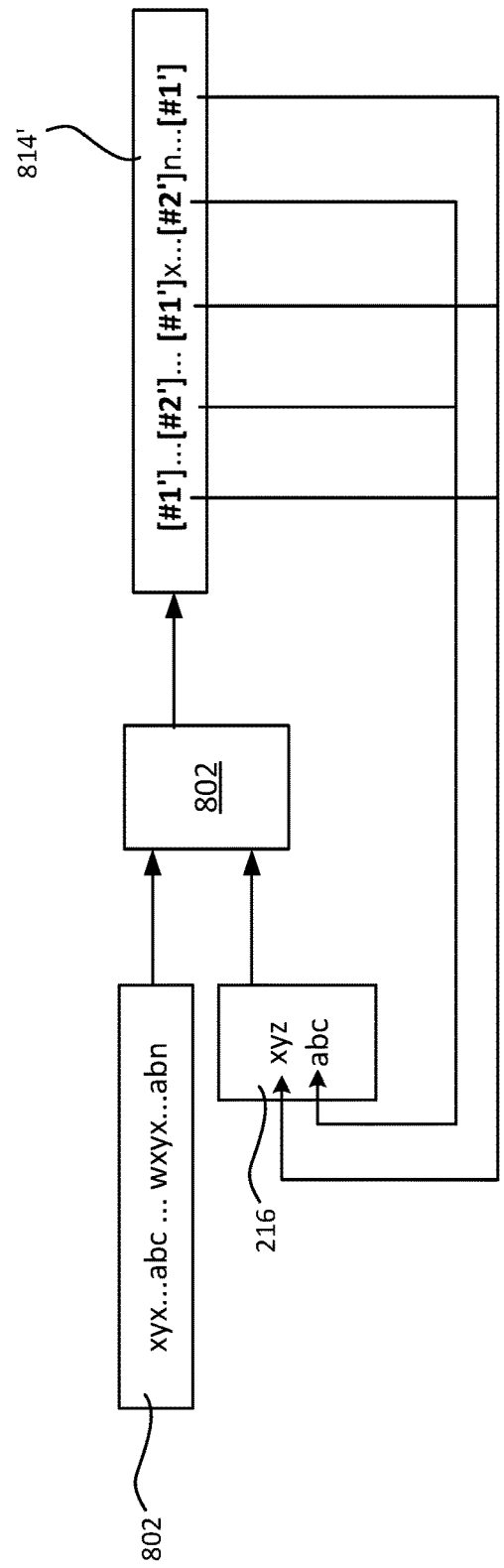

FIGS. 8A and 8B illustrate the operation of an exemplary compression function, represented by block 802. FIG. 8A shows how the compression function 802 may operate without a pre-defined dictionary. In this case, the compression function, in generating a compressed version of the message 814, identifies matching character strings in an input message 804 inputted to the compression function 802. Each time a character string—"xyz" and "abc" in this simplified example—is repeated later in the message, the repeated string is replaced with a reference to the first occurrence of that string—in this example "[#1]" and "[#2]" denote references to the first occurrence of "xyz" and "abc" in the compressed message 814. As will be readily appreciated, replacing strings with references in this manner can reduce the size of the message by avoiding duplicate encoding.

FIG. 8B demonstrates how the compression function can operate based on the pre-defined compression dictionary 216 to achieve a greater size reduction. In this example, the dictionary 216 is shown to comprise, by way of example, the character strings "xyz" and "abc", allowing each occurrence of these strings in the compressed message 214'—including the first occurrences—to be replaced with references to the corresponding string in the dictionary 802—denoted "[#1']" and [#2']" respectively. Another device with access to a matching dictionary can decompress the message 214' using the matching dictionary. The compression function 802 is implemented by the clients and the call controller 210, which also implement corresponding decompression functions. Thus compressed messages can be communicated between the clients and the call controller in both directions.

A compression function that operates in this manner is sometimes referred to in the art as dictionary coder or, equivalently, a substitution coder compression function.

Returning to FIG. 2, FIG. 2 also shows a dictionary server 212 and a dictionary data store 214 connected to the network 106. The dictionary data store holds, in an addressable memory location of the data store 214, the custom compression dictionary 216, whereby the dictionary is accessible to the user device 204a.

The dictionary contains one or multiple sample requests (e.g. one or more request message templates), and helps the Deflate algorithm efficiently compress JSON and SDP as it can refer to names and substrings from the dictionary. This approach has demonstrated significantly better compression than conventional Gzip/deflate, and has rendered this approach viable.

Whenever a request generated by the client 205a or a response generated by the call controller 210 is too large to fit in a single UDP datagram, even when compressed, the client/call controller falls back to the non-preferred protocol (e.g. TCP, e.g. HTTP/TCP).

HTTPS allows for message compression under certain circumstances. However, in HTTPS, compression is something that must be negotiated as part of the HTTPS session establishment: a client must indicate in its initial request which compression scheme(s) is supports if any, and a server will, in its response to this request, indicate whether it too supports any of these. Thus it is impossible to compress the initial request in HTTPS. The HTTPS response may for example include a link (e.g. URI, that is a uniform resource indicator) to a compression dictionary for a compression scheme supported by both the client and the server, so that the client can access the dictionary using the link to compress its subsequent messages.

By contrast, herein a link (e.g. URL) to the custom compression dictionary 216 is pre-distributed to the client 205a by the dictionary server 212. That is, before the client 205a has even attempted to initiate call signaling. That is, before the communication event establishment instruction of step S520 in FIG. 5C has been received by the client 205a, e.g. from the user 202a.

For example, the link may be:
downloaded by the client 502a:
  from the dictionary server 212 upon installation,
  each time a new instance of the client 502a is created on the processor 304
  periodically
pushed to the client by the dictionary server 212, for example any time the dictionary 216 is updated
The client may pre-download the dictionary from the dictionary store 216.

Alternatively, the dictionary itself may be pushed to the client 205a from the data store 214, for example any time it is updated.

An equivalent mechanism will be used by the server when sending notifications to the client. The server will infer the IP address and port for the client from the incoming request, and will attempt to reach the client over UDP first, before falling back to HTTPS (e.g. via a proxy server via which the client 205a is reachable).

Packet Format

Figure 7:
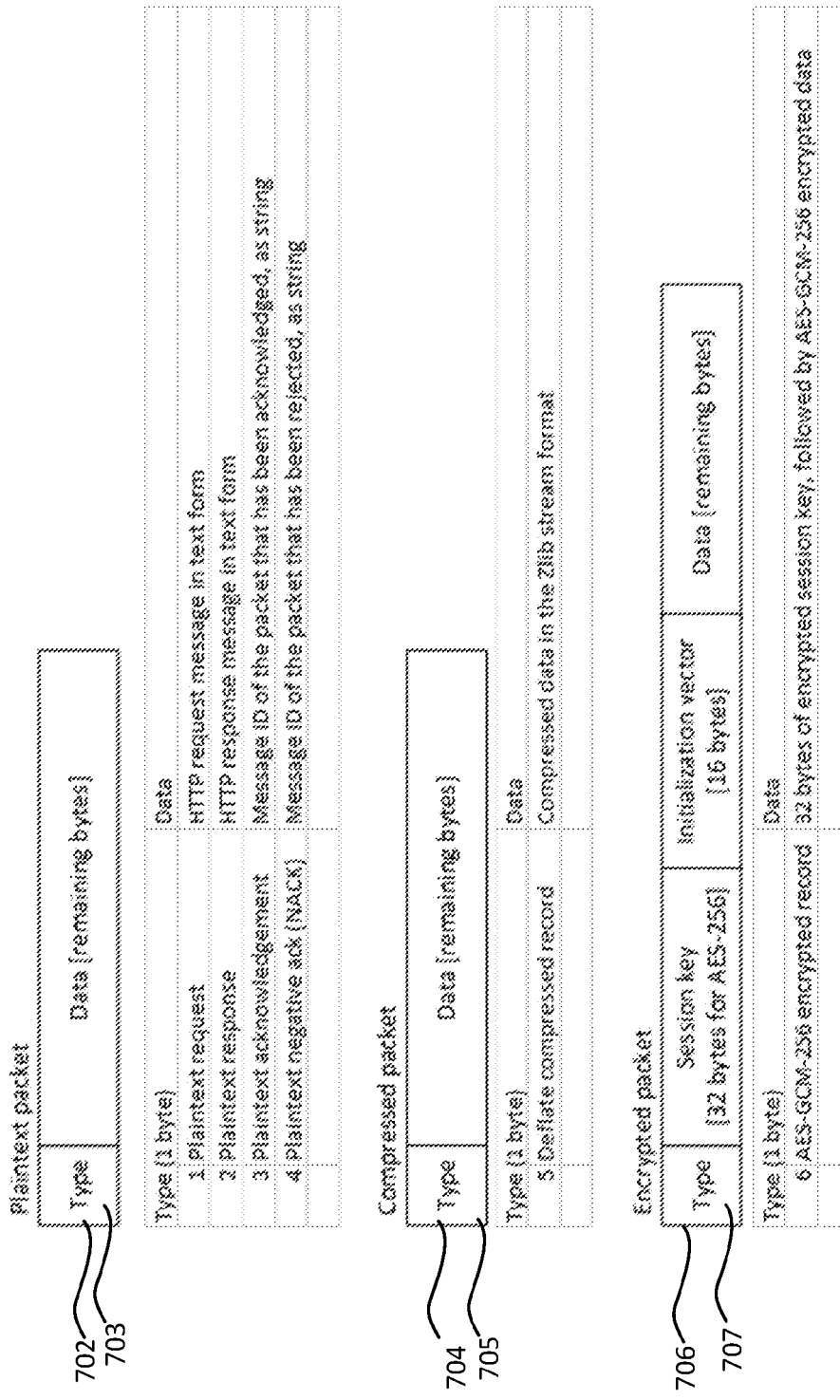
FIG. 7 shows an exemplary data structure for application layer packets.

FIG. 7 shows an exemplary application layer packets.

A plaintext (i.e. uncompressed) packet 702 is shown as comprising an application layer header 702 and a variable length payload. The header consists only a one byte type filed, denoting a type of the packet. In this example, there are multiple types of uncompressed packet denoted by different bytes. The remaining bytes of the packet 702 constitute its payload. Although the payload has a variable length, its length is not identified in the header. This may be a request payload (if generated by the client 205a), or a response payload (if generated by the call controller).

A compressed packet 704, whose payload is obtained by applying the compression function based on the dictionary 212 to the plaintext packet 702. The compressed packet 704 has its own type header 705, which is set to identify it as a compressed packet. In this example, these is only one type of compressed packet though in other implementations multiple compressed types may be used e.g. to denote different compression dictionaries and/or different compression functions. Again, the payload of the compressed packet is variable, but no length field is used.

An encrypted packet 706 is shows, whose payload comprises an encrypted version compressed packet 704 (including its header 704), encrypted with the session key. At least for a resist generated by the client 205, the payload also comprises the initialization vector
the encrypted version of the session key (first embodiment) or the session key ID (second embodiment).

The encrypted packet also has its own type field 707, identifying it as an encrypted packet. In this example, there is only a single type of encrypted packet though other implementations may define multiple types of encrypted packet.

There is no "length" field defined anywhere—only a type filed. The assumption is that the process starts with the entire packet, and recursively parses it as an encrypted packet (if the type indicates so), then a compressed packet, and finally a plaintext packet. The entire UDP packet contains only one message, potentially encapsulated multiple times.

If multiple messages need to be sent in one packet, another envelope type (64 for example) can be defined, which is followed by a 2-byte length field, and then by the data that is encapsulated in the next type of envelope.

More fields can be added (e.g. to identify the compression algorithm, etc.) if the relevant information cannot be encoded in the remaining type values.

Replay Protection:

Replay protection ensures that an attacker resending previously captured messages should not be able to start another call or perform any other action on behalf of the client.

Important calling requests—especially the call setup request—need to be protected against packet replay. There are two mechanisms that work together to prevent replay attacks on the UDP protocol:

Short Term Replay Protection:

The call controller maintains a buffer with the responses to all requests within the last few minutes, indexed by the client-generated Request ID. The buffer is used primarily to provide idempotency in case of the client retrying the request (due to a timeout or a loss of connectivity), but it automatically guards against replay attacks as well. When a response is found in the buffer, it's sent out back to the client and no action is performed. The buffer is maintained in the shared storage 526 for the cluster of server machines 524a, 524b, 524c, so that this replay protection strategy protections the entire cluster, and not just individual machines in the cluster (though the possibility of individual servers maintaining their own buffer is not excluded).

Most requests related to a single call are guaranteed to eventually arrive at the same machine by means of the proxy layer, which associates each call with a specific machine.

In short, the response buffer provides short term replay protection (on the order of 5 minutes).

Long Term Replay Protection:

When a client generates the session ticket, it also uses a date header from the response to estimate the rough time difference between the client and the server clock. All the UDP requests include a timestamp, adjusted for the time offset, and if the mismatch between the real server time and the timestamp is larger than the response buffer duration (5 minutes), the request is discarded and a negative acknowledgement packet is sent to the client for that request ID.

There is a possibility of false positives, if the client's clock is adjusted by more than 5 minutes in between the retrieval of the ticket and its use, but this is acceptable since the UDP protocol is just an optimization—in that event, the client will just fall back to e.g. TCP (e.g. HTTP/TCP) after receiving a negative ACK, or after the short fallback timeout (1-2 seconds) elapses.

As noted above, the various methods of sections 1), 2a) and 2b) of the present disclosure can be combined to achieve the effects set out above. However, the techniques are nevertheless separable. That is, for example, the encryption techniques of 1) of the present disclosures can in other contexts be implemented without the data compression techniques of 2a) and/or without the protocol fallback techniques of 2b) and vice versa.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors. For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

A first aspect of the present subject matter is directed to a method of establishing a communication event between an initiating device and a responding device under the control of a remote communications controller, the method comprising implementing by the initiating device the following steps:

in a pre-communication event establishment phase: establishing a secure connection between the initiating device and the communications controller, exchanging session key negotiation messages between the initiating device and the communications controller via the secure connection to obtain, in a memory location accessible to the initiating device, session key data for use by the initiating device in generating encrypted message payloads that are decryptable by the communications controller, wherein the secure connection terminates once the so session key data has been obtained;

in a subsequent communication event establishment phase:

generating a communication event request payload for transmission to the communications controller;

encrypting the request payload using the session key data stored in the accessible memory location; and in response to a communication event establishment instruction received at the initiating device after the session key data has been obtained and the secure connection has terminated in the pre-establishment phase, transmitting from the initiating device to the communications controller a communication event request comprising the encrypted request payload, thereby causing the communications controller to decrypt the encrypted request payload, whereby the communication event between the devices is established under the control of the communications controller based on the decrypted payload.

In embodiments, the request payload may identify the responding device, whereby transmitting the communication event request to the communications controller causes the communications controller to decrypt the encrypted request payload and transmit a communication event invite to the responding device identified in the decrypted payload.

For example, the request may comprise: a device identifier of the responding device, and/or a user identifier of a user of the remote device, and/or or a network address of the responding device, and thereby identifies the responding device.

The secure connection may be a TLS or HTTPS connection.

The TLS connection may be established using a (reliable) connection oriented transport protocol, e.g. TCP.

By contrast, the communication event request message may be sent using a connectionless transport protocol, e.g. UDP. Alternatively, it may be sent using an otherwise unsecured connection, e.g. unsecured transport layer connection such as TCP and/or an unsecured higher layer connection, such as an HTTP connection.

The session key negotiation messages may be exchanged via the secure connection at an application layer of a network, above a transport layer of the network.

The session key data may comprise an encrypted version of a session key received from the communications controller in the pre-establishment phase, the session key having been encrypted by the communications controller using a wrapper key available to communications controller.

As noted above, this allows stateless operation of the communications controller.

Alternatively (or in addition), the session key data may comprise a session key identifier for identifying the session key to the communications controller.

The session key data may also comprise:
a version of the session key not encrypted with the wrapper key, and/or
a client secret and a server secret for generating the unencrypted version of the session key.

The initiating device may encrypt the request payload using the session key, wherein the request may also comprise:
the encrypted version of the session key, whereby the request causes the communications controller to decrypt the session key using the wrapper key, and decrypt the request payload using the decrypted session key, and/or
the session key identifier.

The initiating device may encrypt the payload using an encryption key derived from the session key.

For example, the initiating device may generate the encryption key by applying a key derivation function to the unencrypted version of the session key, and uses the derived encryption key to encrypt the payload.

Alternatively, the initiating device may generate the encryption key by applying a key derivation function to the encrypted version of the session key, and use the derived encryption key to encrypt the payload. In this case session key may not be exchanged via the secure connection. For example, a key exchange mechanism such as the known Diffie-Hellman algorithm may be used, to allow the initiating device and the communications controller to agree on a symmetric session key without ever exchanging the agreed upon symmetric session key, in a manner which makes it impossible for any snooper to guess the final symmetric key. However, even in this case, in the present context the secure connection is still used to exchange some unencrypted key derivation input data, even if it is not the session key per se. Accordingly, unencrypted key derivation input data may be exchanged via the secure connection and used as an input to the key derivation function in generating the encryption key (e.g. as an input to the Diffie-Hellman algorithm).

The session key may be generated by the communications controller, and the unencrypted version of the session key may be received from the communications controller via the secure connection in the pre-establishment phase.

The session key may be generated by the communications controller independently of any information provided to the communications controller by the initiating device.

Alternatively, the initiating device may generate a client secret and transmit it to the communications controller in the pre-establishment phase, and receives a server secret from the communications controller in the pre-establishment phase, wherein at least one of the secrets (i.e. one or both of the secrets) is transmitted via the secure connection; the initiating device may generate an unencrypted version of the session key by combining the client secret with the server secret, and use the unencrypted version of session key to encrypt the payload.

The session key data may comprise the session key identifier, and a version of the session key may be stored in a memory location accessible to the communications controller in association with the session key identifier.

The version of the session key stored in the memory location accessible to the communications controller may be an encrypted version of the session key, encrypted with the wrapper key. Alternatively, the version of the session key stored in the memory location accessible to the communications controller may be a version of the session key not encrypted with the wrapper key, which is stored only in volatile memory.

The session key identifier may be received from the communications controller by the initiating device, or the session key identifier is generated by the initiating device and transmitted to the communications controller (e.g. GUID).

The request also may also comprise a randomized initialization vector generated by the initiating device, whereby the initiating device can reuse the session key data for a later communication event with a different initialization vector.

The initiating device may generate integrity check data by applying a hash function to at least the payload once encrypted, wherein the request may also comprise the integrity check data, whereby the communications controller can use the integrity check data to detect any alteration to encrypted payload before decrypting it.

The hash function may be applied using an authentication key derived from the session key.

The hash function may be applied to a combination (e.g. concatenation) of the encrypted payload and the initialization vector.

The session key data may also comprises an identifier of the wrapper key received from the communications controller, wherein the request transmitted to the communications controller may also comprise the identifier of the wrapper key, whereby the controller can identify which wrapper key to decrypt the session key with.

The wrapper key may be stored only in volatile memory accessible to the communications controller.

The pre-establishment phase may comprise receiving at the initiating device from the communications controller a timestamp denoting a time measured remotely at the communications controller, wherein the initiating device may store an indication of a difference between the remotely measured time and a time measured locally at the initiating device.

The request may also comprise a timestamp generated by the initiating device accounting for the difference between the locally measured time and the remotely measured time.

The communications controller may determine a difference between the timestamp in the request a time of receipt of the request at the communications controller, and may be configured to reject the request if that difference exceeds a first duration.

The communications controller may be a server pool comprising at least two servers having access to shared electronic storage, whereby any server of the pool can respond to the request.

The request may also comprise a randomized request identifier generated by the initiating device.

The request may be received at one of the servers and, in response, the server may store a copy of at least its request identifier in the shared storage, where it remains for a second duration, wherein if any subsequent request comprising a matching request identifier is received at the or another of the servers within the second duration, that server may ignore the subsequent request.

The communication event establishment instruction may be instigated manually by a user of the initiating device. For example the call establishment instruction may be instigated by the user of the initiating device: selecting an option on a display of the initiating device to call the responding device and/or a user of the responding device, or providing a voice or gesture input to the initiating device denoting the responding device and or the user of the responding device.

A communication client may be installed on the initiating device, and the pre-establishment phase may be performed as part of the installation of the client or in response to running the installed client on a processor of the initiating device for the first time.

Alternatively, the pre-establishment phase may be instigated at a time specified by a predetermined session key negotiation schedule. For example, the session key negotiation schedule may specify that new session key data should be obtained once every predetermined number of days. That is, fresh session key data may be obtained on each occasion specified by the schedule.

Alternatively, the pre-establishment phase may be performed each time a communication client is instantiated on a processor of the initiating device. That is, fresh session key data may be obtained each time the client is instantiated.

According to a second aspect of the present subject matter, a method of establishing a session between an initiating device and a remote device comprises implementing at the initiating device the following steps:
  transmitting a session request from the initiating device to the remote device according to a preferred networking protocol;
  monitoring by the initiating device an elapsed time for an initial duration from a timing of the transmission;
  if no provisional response to the request is received at the initiating device within the initial duration, the first device transmitting another session request to the other device according to a non-preferred protocol;
  if a provisional response to the request is received within the initial duration, the initiating device continuing to monitor the elapsed time for an extended duration (e.g. from the transmission of the session request according to the preferred protocol or from the receipt of the provisional response),
  wherein if no final response to the request is received within the extended duration, the initiating device transmits another session request to the other device according to a non-preferred protocol;
  wherein if a final response is received within the extended duration, a session between the initiating device and the other device is established according to the preferred networking protocol.

As such, a session is established between the initiating device and the remote device according to the preferred protocol only if both a provisional response and a final response are received at the initiating device from the remote device within the initial and extended durations respectively. Otherwise, the transmission of the session request according to the non-preferred protocol causes a session to be established between the initiating device and the remote device according to the non-preferred protocol instead.

In embodiments, the session request may comprise a request identifier, and the other session request may comprise a matching request identifier.

Multiple session requests may be transmitted from the initiating device to the remote device according to the preferred networking protocol within the initial duration.

The preferred protocol may be an unreliable transport protocol, and the non-preferred protocol may be a reliable transport protocol. For example, the preferred protocol may be UDP and the non-preferred protocol may be TCP. E.g. the other session request may be transmitted using HTTP over TCP.

If at any time during the initial or the extended duration a protocol fallback message is received by the initiating device from the remote device, the initiating device may in response transmit a session request to the remote device according to the non-preferred protocol.

The remote device may be a communications controller, wherein a communication event is established between the initiating device and a responding device under the control of the call controller based on the established session between the initiating device and the call controller.

For example, each of said session requests may identify the responding device, wherein in response to receiving any of said session requests the communications controller is able to transmit a communication event invite to the responding device identified therein.

The communication event may be a call, a screen sharing session, or a shared whiteboard session.

The initiating device may be configured to apply a compression function to the session request before transmitting it to reduce its size, and the session request, once compressed, may be transmitted once the remote device in a single packet of the preferred protocol.

The initiating device may be configured, if the session request cannot be encapsulated in a single packet of the preferred protocol once compressed, to transmit the session request to the remote device according to the non-preferred protocol instead.

The initial duration may be 2 seconds or less from the transmission of the session request according to the preferred protocol; and/or the extended duration may be 15 seconds or less from the transmission of the session request according to the preferred protocol or from the receipt of the provisional response.

According to a third aspect of the present invention, a method of establishing a session between an initiating device and a remote device comprises implementing at the remote device the following steps:
  receiving from the initiating device a session request according to a preferred networking protocol;
  in direct response to the session request, transmitting to the initiating device a provisional response to the session request according to the preferred protocol;
  processing the session request to generate a final response to the second request, wherein the provisional response is transmitted to the initiating device before said processing has been completed and the final response determined; and
  transmitting the generated response to the imitating device once determined according to the preferred protocol;
  wherein if a matching session request is received from the initiating device according to a non-preferred protocol, in response the remote device retransmits to the initiating device a version of the final response according to the non-preferred protocol.

According to a fourth aspect of the present invention, a method of establishing a session between an initiating device and a remote device comprises implementing at the remote device the following steps:
  receiving from the initiating device a session request according to a preferred networking protocol;

processing the request to generate a response (e.g. final response) to the session request;

determining whether the generate response can be encapsulated in a single packet of the preferred networking protocol;

is so, transmitting the generated response to the initiating device according to the preferred protocol in a single packet of the preferred protocol;

if not, transmitting a protocol fallback message to the initiating device, thereby causing the initiating device to transmit another session request to the remote device according to a non-preferred protocol.

In embodiments of the third aspect, the remote device may store the generated response in, and in response to receiving the other session request from the initiating device according to the non-preferred protocol, the remote device may retrieve the stored response from the accessible electronic storage location and transmit it to the initiating device according to the non-preferred protocol.

The remote device may in embodiments of the second or third aspect be a communications controller and/or a server (e.g. a server of a server cluster of the communications controller).

In embodiments, the preferred networking protocol may be an unreliable (e.g. connectionless) transport protocol (e.g. UDP).

The non-preferred networking protocol may be a reliable (e.g. connection orientated) transport protocol (e.g. TCP).

A fifth aspect of the present subject matter is directed to a method of selecting one of a plurality of transport protocols for use by a network device, the method comprising implementing by the network device the following steps:

generating an uncompressed message for transmission to another device via a network;

generating a compressed vision of the message, having a reduced message size, by applying a compression function to the uncompressed message;

determining the reduced message size of the compressed version;

comparing the reduced message size to a maximum transport packet size of a preferred one of the transport protocols;

if the reduced message size exceeds the maximum transport packet size of the preferred transport protocol, encapsulating the uncompressed or the compressed version of the message into one or more transport packets according to a non-preferred one of the transport protocols, and transmitting the one or more transport packets to the other device according to the non-preferred transport protocol; and if the size of the compressed message does not exceed the maximum transport packet size of the preferred transport protocol, encapsulating the compressed version of the message into a single transport packet according to the preferred transport protocol, and transmitting the transport packet to the other device according to the preferred transport protocol.

In embodiments, the preferred networking protocol may be an unreliable (e.g. connectionless) transport protocol (e.g. UDP), whereby the single packet is a single datagram of the unreliable transport protocol (e.g. UDP datagram).

The non-preferred networking protocol may be a reliable (e.g. connection orientated) transport protocol (e.g. TCP), whereby the one or more transport packets are packet(s) of the reliable transport protocol (e.g. TCP packet(s)).

The compression function may be a dictionary coder compression function.

The network device may be a server device, for example a server device of a communications controller.

Alternatively, the network device may be a client device, for example a user device or other computer device, wherein the steps may be implemented by a communications client executed on a processor of that device.

A sixth aspect of the present subject matter is directed to a method of establishing a communication event between an initiating device and a responding device under the control of a remote communications controller [e.g. server for example of a server cluster with shared cache], the method comprising implementing by the initiating device the following steps:

in a pre-session establishment phase: receiving at the initiating device a compression dictionary or a dictionary link that identifies an addressable memory location, at which a compression dictionary is held;

storing the received compression dictionary or the received dictionary link in electronic storage of the initiating device;

generating an initial session establishment request message for transmission to the communications controller;

applying compression to the initial session establishment request message to reduce its size based on the compression dictionary, using the stored compression dictionary or by using the stored dictionary link to access the compression dictionary; and in response to a communication event establishment instruction received at the initiating device after the dictionary or the dictionary link has been received and stored at the initiating device, establishing a session between the initiating device and the communications controller by the initiating device transmitting the compressed initial session establishment message to the communications controller;

wherein a communication event is established between the initiating device and the responding device based on the established session between the initiating device and the communications controller.

In embodiments, the communication event establishment instruction may be instigated by a user of the initiating device, whereby the dictionary or dictionary link is received before the user has instigated the communication event establishment instruction.

The call establishment instruction may for example be instigated by the user of the initiating device: selecting an option on a display of the initiating device to call the responding device and/or a user of the responding device, or providing a voice or gesture input to the initiating device denoting the responding device and or the user of the responding device. The instigating device may comprise a user interface, via which the instruction is instigated.

The initial session establishment request message may identify the responding device, whereby transmitting it to the communications controller may cause the communications controller to transmit a communication event invite to the responding device identified therein.

The initial session establishment request message may comprise a device identifier of the responding device, and/or a user identifier of a user of the remote device, and/or or a network address of the responding device, and thereby identify the responding device.

The session may be established without transmitting any uncompressed message from the initiating device to the communications controller.

The dictionary link may be a URI.

The compressed initial session establishment message may be transmitted to the communications controller according to a preferred transport protocol only if the compressed initial session establishment request can be encapsulated in a single packet of the preferred transport protocol, wherein the initiating device may be configured to otherwise transmit the initial session establishment request to the communications controller according to a non-preferred transport protocol.

The preferred transport protocol may be an unreliable transport protocol (e.g. UDP) and the non-preferred transport protocol may be a reliable transport protocol (e.g. TCP).

In embodiments, the dictionary link may be a URI that identifies the addressable memory location.

That is, the session between the initiating device and the communications controller is established without the initiating device having to send any uncompressed message to the communications controller. This is in contrast to, say, HTTPS, which requires at least the first message sent from a client to a server to be uncompressed (to account for devices that don't support compression).

Any communications event referred to herein may for example be a call, [e.g. call, screen sharing session, shared whiteboard session etc.

According to another aspect of the present subject matter, a network device (e.g. an initiating device or a remote device such as a server device) comprises electronic storage configured to hold executable code, and a processor connected to the electronic storage and configured to execute the code, wherein the executable code is configured when executed on the processor to implement any of the method steps disclosed herein.

According to yet another aspect of the present subject matter, a computer program product comprises executable code stored on a computer readable storage medium and configured, when executed on a processor of a network device (e.g. an initiating device or a remote device such as a server device), to implement any of the method steps disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of establishing a session between an initiating device and a remote device, the method comprising:
  at the initiating device, using one or more hardware processors to perform operations comprising:
  transmitting a session request from the initiating device to the remote device according to a first networking protocol, wherein the first network protocol is a stateless transport layer protocol;
  setting a protocol fallback timer to a timeout value; and
  retransmitting, responsive to the protocol fallback timer expiring without receiving a final response, the session request to the remote device using a second networking protocol instead of the first networking protocol, wherein the second networking protocol is a stateful transport layer protocol.

2. A method according to claim 1, wherein the session request comprises a request identifier.

3. A method according to claim 1, further comprising, at the initiating device:
  setting a retry timer when transmitting the session request, the retry timer set to a second timeout value that is less than the timeout value; and
  responsive to the retry timer expiring without receiving either a final response or a provisional response:
    retransmitting the session request to the remote device using the first protocol; and
    resetting the retry timer to the second timeout value.

4. A method according to claim 1, wherein the first protocol is a User Datagram Protocol, and the second protocol is Transport Control Protocol.

5. A method according to claim 1, further comprising:
  setting a retry timer when transmitting the session request, the retry timer set to a second timeout value that is less than the timeout value; and
  receiving a provisional acknowledgement prior to the retry timer expiring again, and in response, clearing the retry timer and extending the protocol fallback timer.

6. A method according to claim 4, wherein the session request is retransmitted using Hypertext Transfer Protocol (HTTP) over TCP.

7. A method according to claim 1, wherein the session request is a Session Initiation Protocol (SIP) session request to setup a Voice over IP session.

8. A method according to claim 1, wherein the remote device is a communications controller, wherein a communication event is established between the initiating device and a responding device under the control of the communication controller based on the established session between the initiating device and the communication controller.

9. A method according to claim 8, wherein each of said session requests identifies the responding device, wherein in response to receiving any of said session requests the communications controller is able to transmit a communication event invite to the responding device identified therein.

10. A method according to claim 8, wherein the communication event is a call, a screen sharing session, or a shared whiteboard session.

11. A method according to claim 1, further comprising, at the initiating device: applying a compression function to the session request before transmitting it to reduce its size, and the session request, once compressed, is transmitted once the remote device in a single packet of the first protocol.

12. A method according to claim 1, further comprising, at the initiating device:
  determining that a compression function applied to a second session request produces a size of packet that is too large to be encapsulated in a single packet of the first protocol and in response transmitting the second session request using the second protocol.

13. A computer readable storage device comprising instructions, which when executed on a processor of an initiating device to establish a communication event between an initiating device and a responding device under the control of a remote communications controller cause the initiating device to perform operations comprising:
  transmitting a session request from the initiating device to the responding device according to a first networking protocol, wherein the first network protocol is a stateless transport layer protocol;
  setting a protocol fallback timer to a timeout value; and
  retransmitting, responsive to the protocol fallback timer expiring without receiving a final response, the session request to the responding device using a second networking protocol instead of the first networking protocol, wherein the second networking protocol is a stateful transport layer protocol.

14. The computer-readable storage device of claim 13, wherein the operations further comprise:
    setting a retry timer when transmitting the session request, the retry timer set to a second timeout value that is less than the timeout value; and
    responsive to the retry timer expiring without receiving either a final response or a provisional response:
        retransmitting the session request to the responding device using the first protocol; and
        resetting the retry timer to the second timeout value.

15. The computer readable storage device of claim 13, wherein the session request comprises a request identifier and wherein the session request is retransmitted using HTTP over TCP.

16. The computer readable storage device of claim 13, wherein the communication event is one of: a call, a screen sharing session, or a shared whiteboard session.

17. The computer readable storage device of claim 13, wherein the operations further comprise:
    setting a retry timer when transmitting the session request, the retry timer set to a second timeout value that is less than the timeout value; and
    receiving a provisional acknowledgement prior to the retry timer expiring, and in response, clearing the retry timer and extending the protocol fallback timer.

18. The method of claim 1, wherein the session request comprises a message used to setup a call.

19. The method of claim 1, further comprising:
    repeatedly retransmitting the session request using the stateless transport layer protocol prior to expiry of the protocol fallback timer.

20. The method of claim 1, wherein the method further comprises:
    responsive to the retransmitting, utilizing the stateful transport layer protocol for subsequent messages to the remote device.

* * * * *